United States Patent [19]

Matsumoto et al.

[11] Patent Number: 5,396,477
[45] Date of Patent: Mar. 7, 1995

[54] LIGHT SPOT POSITIONING METHOD AND OPTICAL DISC MEMORY APPARATUS EMPLOYING THE SAME

[75] Inventors: Kiyoshi Matsumoto; Takeshi Maeda, both of Kokubunji; Masuo Kasai, Hachioji, all of Japan

[73] Assignee: Hitachi, Ltd., Tokyo, Japan

[21] Appl. No.: 406,735

[22] Filed: Sep. 13, 1989

[30] Foreign Application Priority Data

Sep. 21, 1988 [JP] Japan ................. 63-234978
Jul. 10, 1989 [JP] Japan ................. 1-175462

[51] Int. Cl.⁶ .............................................. G11B 7/00
[52] U.S. Cl. ......................... 369/44.28; 369/44.31; 369/44.32; 369/56; 369/44.11; 369/44.13; 369/44.34; 369/32
[58] Field of Search ............... 369/44.29, 44.11, 44.31, 369/44.32, 44.13, 44.28, 32, 56, 57, 44.34

[56] References Cited

U.S. PATENT DOCUMENTS

| | | | |
|---|---|---|---|
| 4,525,823 | 6/1985 | Sugiyama et al. | 369/44 |
| 4,525,826 | 6/1985 | Nakamura et al. | 369/44 |
| 4,607,358 | 8/1986 | Maeda et al. | 369/44.28 |
| 4,627,039 | 12/1986 | Meyer | 369/44.28 |
| 4,707,816 | 11/1987 | Yonezawa et al. | 369/44.13 |
| 4,731,771 | 3/1988 | Maeda et al. | 369/44.13 |
| 4,745,587 | 5/1988 | Maeda et al. | 369/44.34 |
| 4,760,568 | 7/1988 | Jipson et al. | 369/44.26 |
| 4,764,911 | 8/1988 | Morota et al. | 369/44.29 |
| 4,866,688 | 9/1989 | Ohtake et al. | 369/44.13 |
| 4,926,405 | 5/1990 | Hangai et al. | 369/44.13 |
| 4,933,922 | 6/1990 | Yokogawa | 369/44.13 |
| 4,951,275 | 8/1990 | Saitoh et al. | 369/44.34 |
| 4,975,895 | 12/1990 | Yanagi | 369/44.29 |
| 4,985,882 | 1/1991 | Tanaka et al. | 369/44.34 |
| 5,012,460 | 4/1991 | Popovich et al. | 369/44.34 |
| 5,031,165 | 7/1991 | Fujita | 369/44.13 |
| 5,073,880 | 12/1991 | Maeda et al. | 369/44.13 |
| 5,144,609 | 9/1992 | Takeda et al. | 369/44.13 |

FOREIGN PATENT DOCUMENTS

| | | |
|---|---|---|
| 0090379 | 10/1983 | European Pat. Off. . |
| 0102057 | 7/1984 | European Pat. Off. . |
| 0221782 | 5/1987 | European Pat. Off. . |
| 0260488 | 3/1988 | European Pat. Off. . |
| 2342906 | 3/1974 | Germany . |
| 3242784 | 6/1983 | Germany . |
| 49-94304 | 7/1974 | Japan . |
| 50-68413 | 7/1975 | Japan . |
| 58-91536 | 5/1983 | Japan . |
| 58-169370 | 10/1983 | Japan . |
| 60-52971 | 3/1985 | Japan . |

*Primary Examiner*—Tommy P. Chin
*Assistant Examiner*—Khoi Troung
*Attorney, Agent, or Firm*—Antonelli, Terry, Stout & Kraus

[57] ABSTRACT

A light spot positioning method and apparatus for performing a seek operation of positioning a record/playback light spot at a desired track on a recording medium by a macro moving mechanism for an optical head and a micro moving mechanism mounted on the optical head or the base of the apparatus, and for selecting the bandwidth of the control servo of the micro moving mechanism to be higher than 10 KHz during a track pull-in operation. By selecting the bandwidth of control servo of the micro moving mechanism higher than 10 KHz, the track can be pulled in with the relative velocity between the track and the light spot remaining high. During a track following operation after the completion of the track access, the band of the control servo of the micro moving mechanism is changed to a low level of lower than 5 KHz.

43 Claims, 22 Drawing Sheets

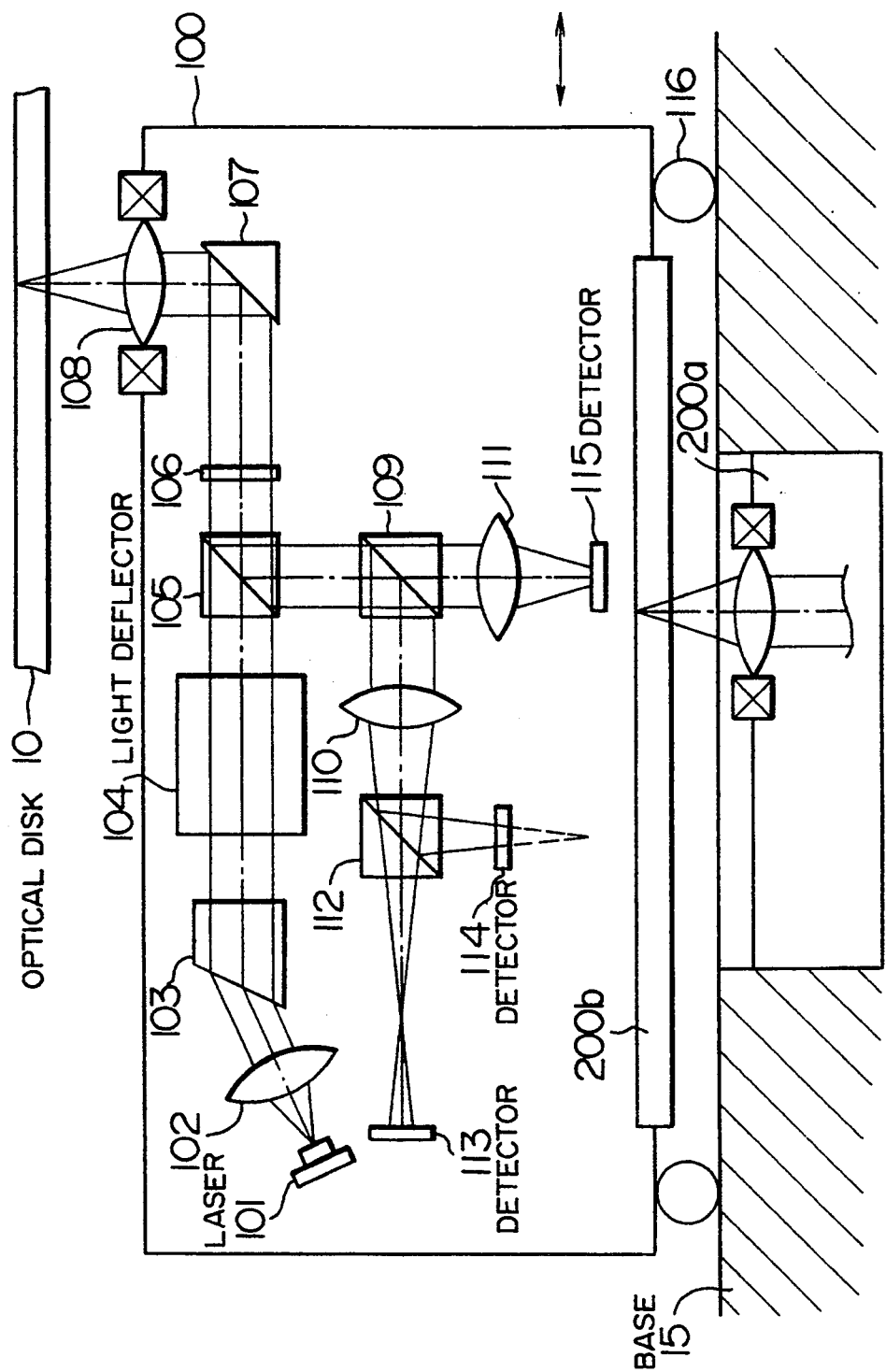

DIRECTION OF MOVEMENT
OF LIGHT SPOT

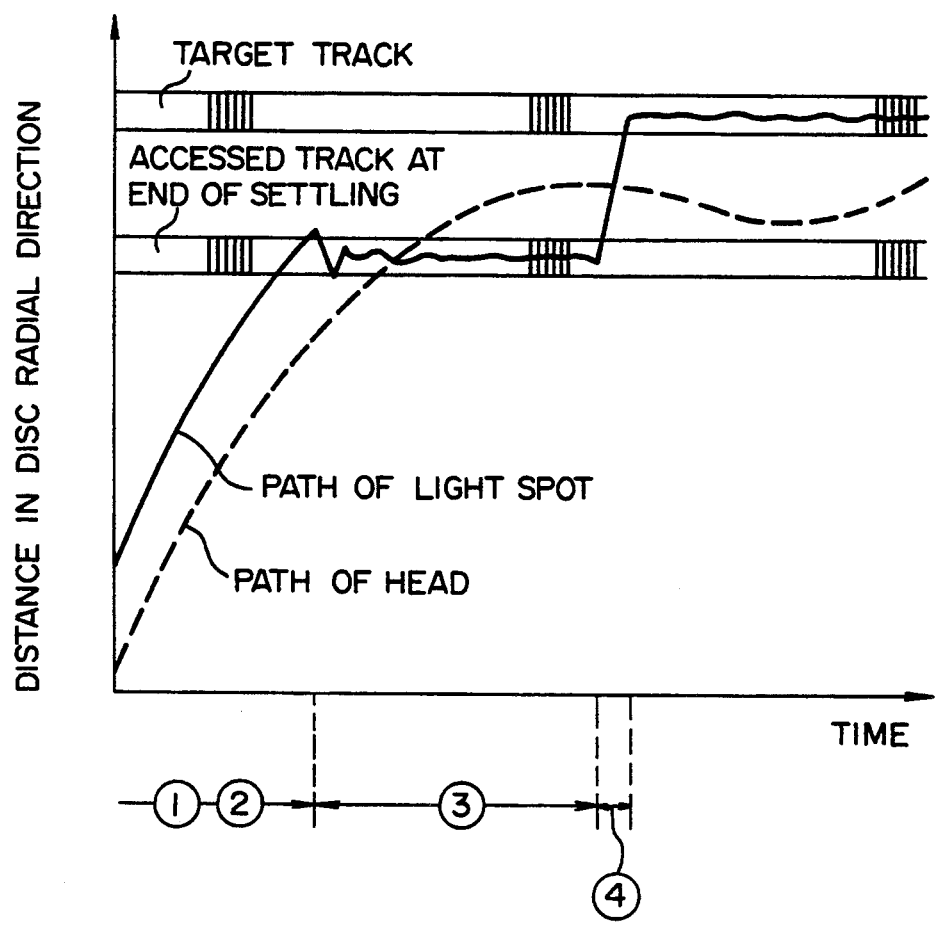
F I G. 15

F I G. 16
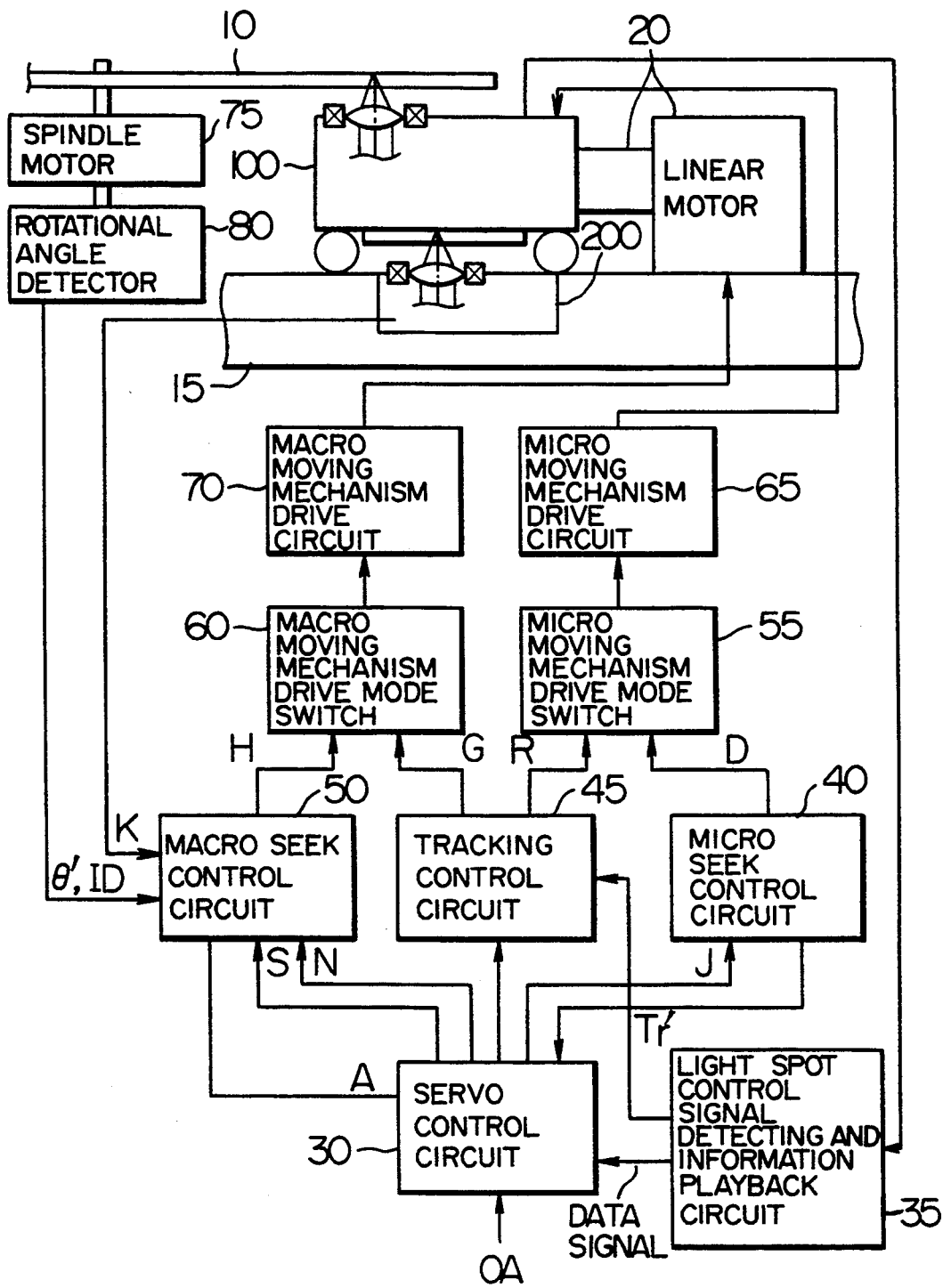

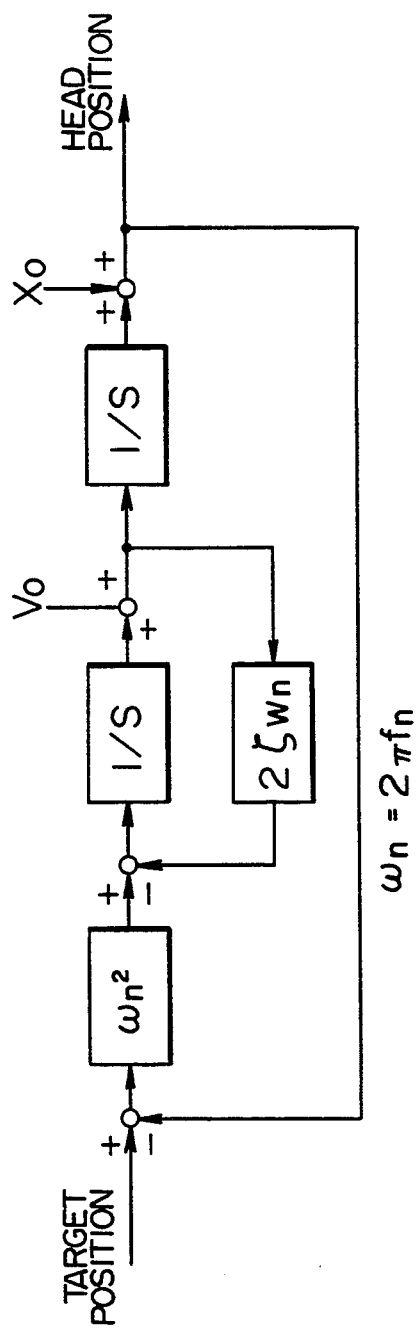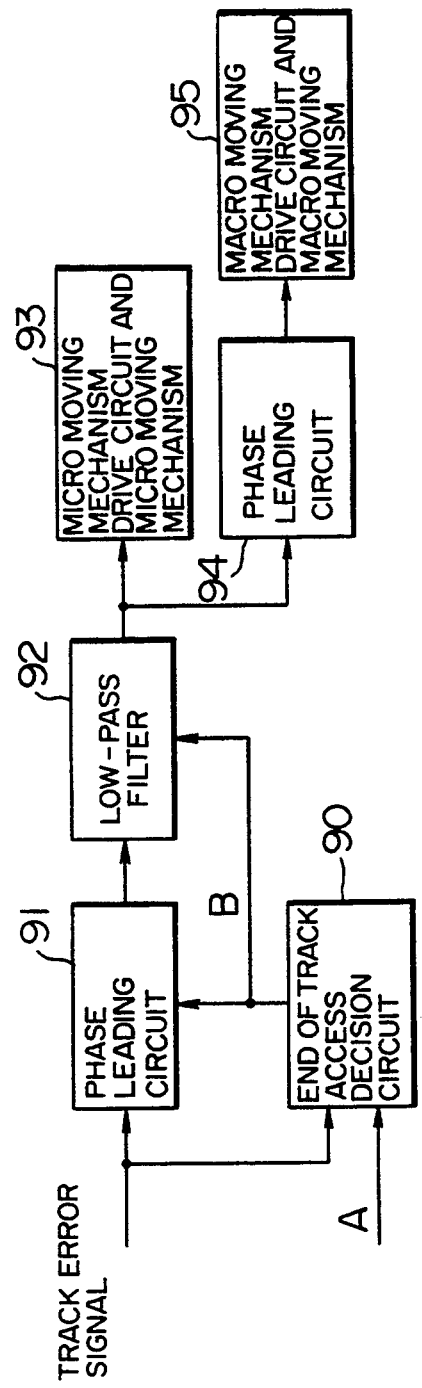

LIGHT SPOT POSITIONING METHOD AND OPTICAL DISC MEMORY APPARATUS EMPLOYING THE SAME

BACKGROUND OF THE INVENTION

The present invention relates to an optical information recording and playback method for projecting a light spot onto an optical recording medium by means of a laser beam to record and/or play back information and optical disc memory apparatus. More particularly, the present invention relates to a light spot positioning method for rapidly positioning a light spot at a desired track by use of a macro moving mechanism (or coarse actuator) and a micro moving mechanism (or fine actuator) and an optical disc memory apparatus employing such light spot positioning method.

Optical disc memory apparatus have been developed as information storage apparatus of the type which records and plays back information from a high recording density-rotary recording medium or of the construction capable of erasing the recording medium as occasion demands.

The optical disc or the rotary recording medium is formed with a large number of tracks arranged concentrically or spirally at a given pitch and each of the tracks is provided with a large number of sectors for indicating the limits of data. In order to record external information at any given position or to play back or erase the information at any given position, there is required an access operation (seek operation) of searching first for selected one of the tracks on the disk surface and then looking for selected one of the sectors in the selected track. In other words, there exists a need for a macro seek control for rapidly moving a spot of light to the vicinity of a desired track, a track following control for maintaining the light spot on the center line of the desired track and a micro seek control for correcting the deviation between the light spot and the desired track. Such access operations in the optical disc memory apparatus are disclosed in JP-A-58-91536, JP-A-58-169370 and U.S. Pat. No. 4,607,358 combining these applications.

In the conventional optical disc memory apparatus, the positioning of a light spot is controlled by means of a macro moving mechanism, e.g., a linear motor for moving an optical head and a micro moving mechanism, e.g., a voice coil for actuating a galvano-mirror or objective lens mounted on the optical head.

In other words, during the seek the record/playback optical head is first coarsely positioned with respect to a designated track on the optical disc by the macro moving mechanism such as a linear motor (macro seek control).

After the setting by this macro seek operation has been completed, a track following operation is performed temporarily through the cooperative operation of the macro moving mechanism and the micro moving mechanism (track following control).

Then, the track address of this location is read to determine the deviation between it and the desired track. To correct the deviation from the desired track, a track jump is repeated by the micro moving mechanism such as a galvano-mirror to move the light spot to the desired track (micro seek control). When the light spot is positioned at the desired track, the tracking control is again performed thereby completing the seek operation.

In order to reduce the macro seek time, the optical head must be driven at a high acceleration rate.

In the optical disc memory apparatus, a light spot converging lens actuator or the previously mentioned micro moving mechanism, optical components, etc., are mounted on the optical head and thus generally the rigidity of the head is small as compared with the magnetic disc apparatus. Thus during the macro seek, the bandwidth of the speed control servo system cannot be increased greatly. If the head is driven at a high acceleration without increasing the band of the speed control system, the speed deviation between its actual speed and the desired speed increases.

The desired speed curve of the macro seek is predetermined so that the speed is decelerated at the maximum acceleration for reducing the seek time and also on the desired track the relative speed of the light spot and the track is decelerated to such speed that permits pulling in the track. This track pulling-in enabling speed is limited by the magnitude of a track deviation signal detection range and the bandwidth of the light spot control loop and it is on the order of 3 mm/sec in the optical disc memory apparatus. On the other hand, where the acceleration for deceleration and the bandwidth of the velocity control servo system are respectively selected as 25 G, where G is a unit of acceleration, and 700 Hz as in the case of the magnetic disc apparatus, the velocity deviation becomes about 55 mm/sec. In other words, in the optical disc memory apparatus, the track cannot be pulled in. In the case of optical disc memory apparatus, the bandwidth of the velocity control system is decreased further and the velocity deviation is also increased, making it impossible to drive the optical head at such high acceleration as in the case of the magnetic disc apparatus. In addition to the velocity deviation, driving the optical head at the high acceleration gives rise to the problem of residual vibrations due to the previously mentioned low rigidity of the head. Even when the macro seek movement has been completed, the settling time for the vibrations of the head is so large that the seek time is not reduced much.

In the optical disc memory apparatus, generally the seek operation is performed in the two steps of the macro seek and the micro seek with the result that even if the speed of the macro seek is reduced to about the same as in the magnetic disc apparatus, the time required for the micro seek is correspondingly increased. The reason for requiring the micro seek resides in that the track pitch of the optical disc is as small as about 1.6 $\mu$m. In other words, in view of such problems as the positioning accuracy of the macro moving mechanism, the accuracy of the head position detector and the large eccentricity of the optical disc, it is difficult to reach the desired track by the macro seek alone. Thus, the deviation from the desired track is corrected by the micro seek. On the contrary, in the magnetic disc memory apparatus the track pitch of the magnetic disc is as large as about 20 $\mu$m and also the eccentricity of the disc is small as compared with the optical disc, thereby making it possible to reach the desired track by the macro seek alone. Thus, it is difficult to drive the optical disc memory apparatus at about the same acceleration as the magnetic disc memory apparatus and moreover the seek time cannot be reduced much even if the optical disc is driven at the high acceleration.

On the other hand, there is known the so-called cross-track seek as the seek system which does not perform the micro seek.

In this cross-track seek system, as disclosed in the previously mentioned JP-A-58-91536 or U.S. Pat. No. 4,607,358, the number of track passage pulses each generated upon traversing a track is counted and an optical head is positioned at the desired track by the use of a macro moving mechanism alone. However, where the cross-track seek is effected at a high speed, the header or the data signal written into the disc enters a tracking error signal and thus its band and the band of the track passage pulses overlaps each other, thus causing an erroneous counting of the number of tracks passed. As a result, the light spot cannot be positioned accurately at the desired track and a correction must be made by the micro seek, thus making it difficult for the cross-track seek system to reduce the seek time.

Due to these deficiencies, the optical disc memory apparatus has the disadvantage of requiring a long seek time as compared with the conventional memory apparatus, particularly the magnetic disc memory apparatus. The average seek time of a 12" optical disc memory apparatus is as slow as about 200 msec as compared with that of a 14" magnetic disc memory apparatus which is about 15 msec.

SUMMARY OF THE INVENTION

With a view to overcoming the foregoing deficiencies in the prior art, it is an object of the present invention to provide a light spot positioning method which realizes a high-speed seek comparable with that of the magnetic disc memory apparatus and an optical disc memory apparatus employing such light spot positioning method.

It is another object of the present invention to provide a light spot positioning method in which an optical head is actuated at a high acceleration thereby reducing the required macro seek time and an optical disc memory apparatus employing such light spot positioning method.

It is still another object of the present invention to provide such method and apparatus so designed that even if an optical head is actuated at a high acceleration, the light spot is brought to (pulled in) a selected track with the relative speed therebetween being high and the track access time or pull-in time is reduced.

In accordance with the present invention, the following means are used.

(1) The bandwidth of a control servo system of a light spot micro moving mechanism is selected higher than 10 KHz during the track pull-in movement. By selecting the control band of the micro moving mechanism higher than 10 KHz, the accessing of a track can be effected with the relative speed of the track and the light spot being high. While the band of the control system is limited by the characteristics of the micro moving mechanism, the band can be made higher than 10 KHz by using a micro moving mechanism operable at a higher speed than the conventional galvano-mirror, two-dimensional actuator or the like, e.g., a non-mechanical optical deflector such as an A/O (acousto/optic) deflecting device or SAW (Surface Acoustic Wave) device. Then, during the track following operation after the completion of the track pull-in the bandwidth of the control system of the micro moving mechanism is changed over to a low level of less than 5 KHz. The reason is that if the bandwidth of the control system of the micro moving mechanism is allowed to remain high, due to the excellent response characteristic even at high frequencies, the light spot is caused to oscillate excessively due to a defect of the track, dust particles, noise or the like. Thus, the present invention features that the bandwidth of the control system of the micro moving mechanism is changed from one value to another between the track pull-in operation and the track following operation.

(2) As a linear scale for detecting the amount and rate of movement of the optical head, there is used a micro-pitch laser scale including a scale formed with grooves of about the same pitch as the track pitch of the optical disc and an optical system fixedly mounted on the base to detect the grooves in the scale.

(3) Track error detecting means for detecting a track error signal from the reflected light of the light spot includes means for correcting an offset caused by the deviation of the reflected light from the optical central axis. Then, in accordance with the offset-corrected track error signal, a macro moving mechanism and the micro moving mechanism are respectively driven during a track pull-in operation and a track following operation, thereby forming a two-stage tracking servo system.

During the track pull-in operation, the bandwidth of the control system of the light spot micro moving mechanism is increased over 10 KHz so that even if the optical head is driven at a high acceleration to perform a macro seek, the light spot can be brought to (pulled-in) the track with the relative speed between the track and the light spot remaining high.

For instance, if the bandwidth is increased up to about 12 KHz, the track can be pulled in at a speed of 55 mm/sec, whereas if it is increased up to about 22 KHz, the track can be pulled in at about the same speed of 100 mm/sec as the magnetic disc memory apparatus. Thus, the macro seek can be effected at a high acceleration and the time required for the macro seek can be reduced.

Also, where the head is driven at a high accleration, while the mechanical residual vibrations of the head after the completion of the macro seek are increased, these vibrations can be suppressed by increasing the bandwidth of the control system of the micro moving mechanism. Therefore, there is no need to wait for damping of the residual vibrations.

In addition, the time required for the track pull-in itself is reduced. For instance, the time required for the pull-in is 100 μsec when the bandwidth is increased to about 12 KHz and the required time is 60 μsec when increased to 20 KHz thereby increasing the speed.

Further, by increasing the control bandwidth of the micro moving mechanism, the operation of the micro moving mechanism is effected more rapidly than previously and the time required for the micro seek is reduced.

By using the signals from the micro-pitch laser scale, it is possible to perform substantially the same operation as the cross-track seek. In other words, the number of pulses from the micro-pitch laser scale is counted and the optical head is positioned at a desired track by use of the macro moving mechanism. Even in the case of a high-speed seek, there is no crosstalk other than the position signal so that there is danger of causing any erroneous count and the light spot can be substantially accurately positioned at the desired track by the macro seek only. Even if the light spot is not positioned at the desired track, the resulting deviation is considerably small and the amount of correction by the micro seek is reduced.

By using the micro-pitch laser scale, velocity information of greater accuracy than previously can be obtained and the velocity control during the macro seek period can be effeced stably and rapidly. The mechanical residual vibrations of the head can be reduced and the setting time is also decreased.

The track error detecting means includes the offset correcting means so that even if the movement of the light spot by the micro moving mechanism causes its reflected light to deviate from the optical central axis and it is moved on the detection surface of a detector, an accurate track error signal is detected and the light spot is accurately and stably positioned at the desired track, thereby effecting a track following control.

In accordance with the present invention, the time required for the macro seek or the micro seek can be reduced and thus the optical disc memory apparatus is realized which is capable of effecting about the same high-speed seek as the magnetic disc memory apparatus.

BRIEF DESCRIPTION OF THE DRAWINGS

FIG. 1 is a diagram showing an embodiment of an optical head used with the present invention.

FIG. 15 is a diagram showing the movements of the optical head and the light spot during the two-stage seek of the present invention.

FIG. 16 is a schematic block diagram showing an exemplary construction of a seek control circuit.

FIG. 22 is a block diagram showing a linear position control system.

FIG. 24 is a block diagram showing an example of the construction for changing the bandwidth of the control system.

DESCRIPTION OF THE PREFERRED EMBODIMENTS

Figure 2A:
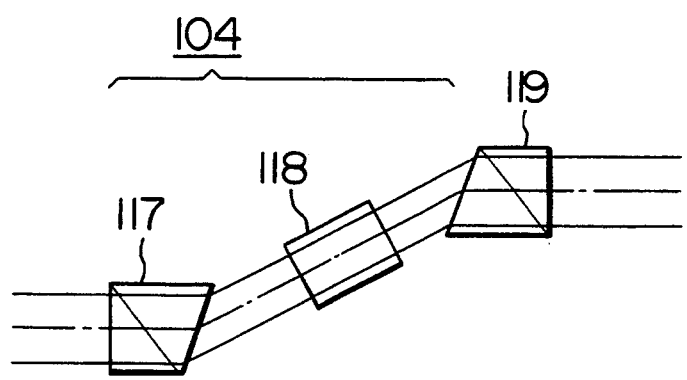
FIGS. 2A and 2B show respectively an example of an optical deflector including an A/O deflecting device and used as a micro moving mechanism and its operating principle.

Referring to FIG. 1, there is illustrated an embodiment of an optical head used with the present invention. The light emitted from a laser diode 101 is converted into a collimated beam by a collimating lens 102, reshaped to a circular beam by a beam shaping prism 103 and then directed to a light deflector 104 adapted to operate as a micro moving mechanism. The light deflector 104 is comprised of a non-mechanical light deflecting device such as an A/O deflecting device or SAW device and a beam shaper. The light beam having its emission angle changed by the light deflector 104 is directed to a polarizing prism 105. In this case, by selecting the polarization of the light beam to be an S polarized light with respect to the polarizing prism 105, a large part of the light beam passes straight through the polarizing prism 105. The light beam emerging from the polarizing prism 105 is converted into circularly polarized light beam through a λ/4 plate 106 and it is then projected onto an optical disc 10 through a reflecting mirror 107 and converging lens 108, thereby focusing the light spot on the optical disc 10. This light spot can be moved in the tracking direction by the previously mentioned light deflector 104.

The light reflected by the optical disc 10 is again passed through the converging lens 108, the reflecting mirror 107 and the λ/4 plate 106 and again the light beam is restored to a linearly polarized light by the λ/4 plate 106. At this time, the polarized light takes the form of S polarized light to the polarizing prism 105 so that it is not passed through but reflected from the polarizing prism 105 and directed to a detection optical system. In other words, the reflected light beam is directed to a half prism 109 from which the light beam is divided into two directions. One part is condensed onto a track deviation signal detecting detector 115 by a convex lens 111. The other part is condensed by a convex lens 110 and it is then condensed onto focus error detecting data signal detecting detectors 113 and 114, which are of a front-to-back differential type, by a half prism 112. In other words, the detector 113 is positioned in the rear of the convergence point and the other detector 114 is positioned in the front of the convergence point, that is, the detectors 113 and 114 are arranged so that they receive the light of the same intensity in an in-focus condition where there exists coincidence between the focal point of the light spot projected onto the optical disc 10 and the information recording surface.

An optical head 100 can be moved in the radial direction of the disc 10 by a coarse actuator such as a linear motor 20 (see FIG. 16) which operates as a macro moving mechanism.

A laser scale 200 is used for detecting the amount and rate of movement of the optical head 100 which moves with respect to a base 15 by way of rollers 116. In other words, mounted on the optical head 100 is a micro-pitch scale 200b formed with grooves of about the same pitch as the optical disc 10, and the laser beam is projected onto the scale 200b through an optical system 200 mounted on the base 15 to examine the resulting reflected light and thereby to detect the amount and rate of the movement of the optical head 100.

Referring to FIG. 2A, there is illustrated a case in which an A/O deflecting device for the light deflector 104 which operates as the micro moving mechanism. While it is preferable to polarize a circular beam of light as such, the aperture of the ordinary A/O deflecting element 118 has a rectangular shape and therefore the beam must be converted to an elliptical shape for improving the efficiency. The incident laser beam is converted to an elliptical beam by a beam converting prism 117 and then directed to the A/O deflecting element 118 whose output beam is restored to a circular beam again by a beam converting prism 119.

Figure 2B:
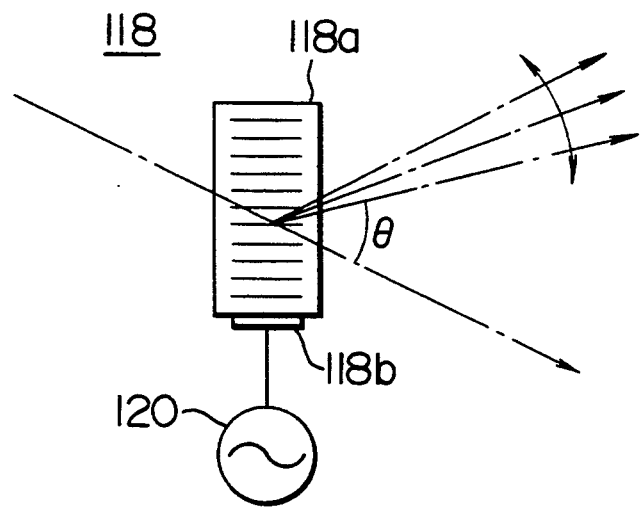

The operation of the A/O deflecting element 118 will now be described with reference to FIG. 2B. The A/O deflecting element 118 includes a medium 118a transparent to the laser light beam, a piezoelectric transducer 118b for propagating ultrasonic wave through the medium 118a and a high-frequency power source 120 for driving the piezoelectric transducer 118b whereby the ultrasonic wave produced by the piezoelectric transducer 118b is propagated via the medium 118a so that the compressional wave of the ultrasonic wave causes periodic variations of the refractive index due to the acosto-optic effect of the medium 118a. This variation of the refractive index serves the role of a phase grating with respect to the incident light to the medium 118, thereby diffracting the light beam. Assuming that f represents the frequency of the ultrasonic wave, v the propagation velocity of the ultrasonic wave and λ the wavelength of the incident light, then the diffraction angle θ is given by the following equation $$\theta \approx \frac{f \cdot \lambda}{v}$$

Generally, the propagation velocity v of the ultrasonic wave and the wavelength λ of the incident light are constant and therefore the frequency f and the diffraction angle θ are proportional to each other. As a result, by changing the frequency f, the diffraction angle θ can be changed, that is, the defletion angle of the light beam can be changed.

Figure 3:
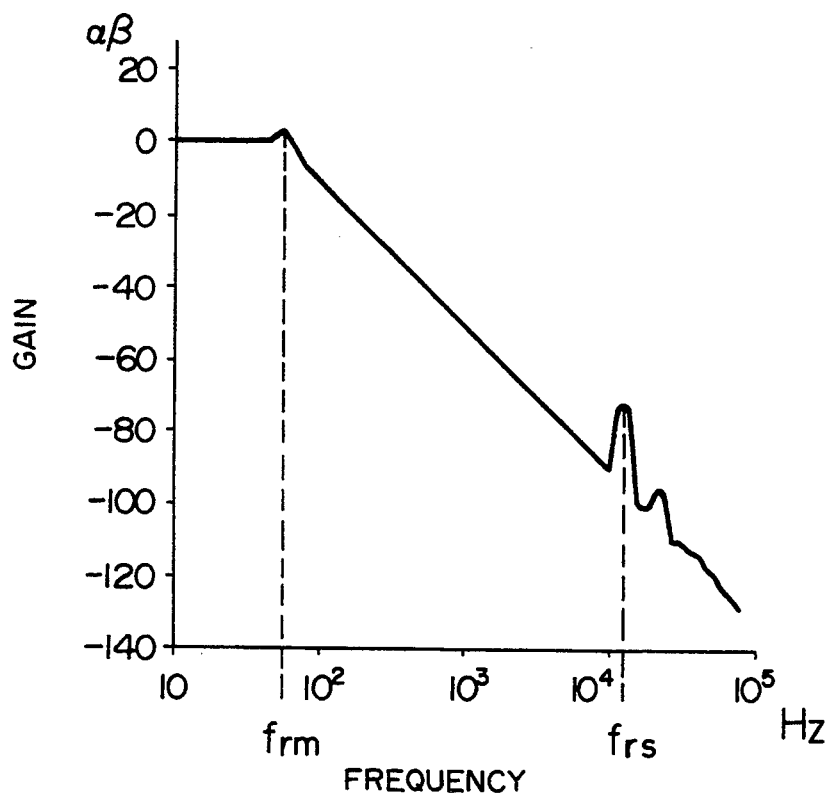
FIG. 3 is a graph showing an example of a characteristic of a mechanical actuator.

In the conventional optical disc memory apparatus, a mechanical rotating mirror such as a galvano-mirror is used as a micro moving mechanism thereby deflecting a beam of light. FIG. 3 shows an example of a characteristic of a mechanical actuator comprising a galvano-mirror. The gain decreases after exceeding a principal resonance point frm. Also, the gain attains its peak at a secondary resonance point frs and therefore the bandwidth of the servo system can be extended only up to 4 to 5 KHz.

Figure 4:
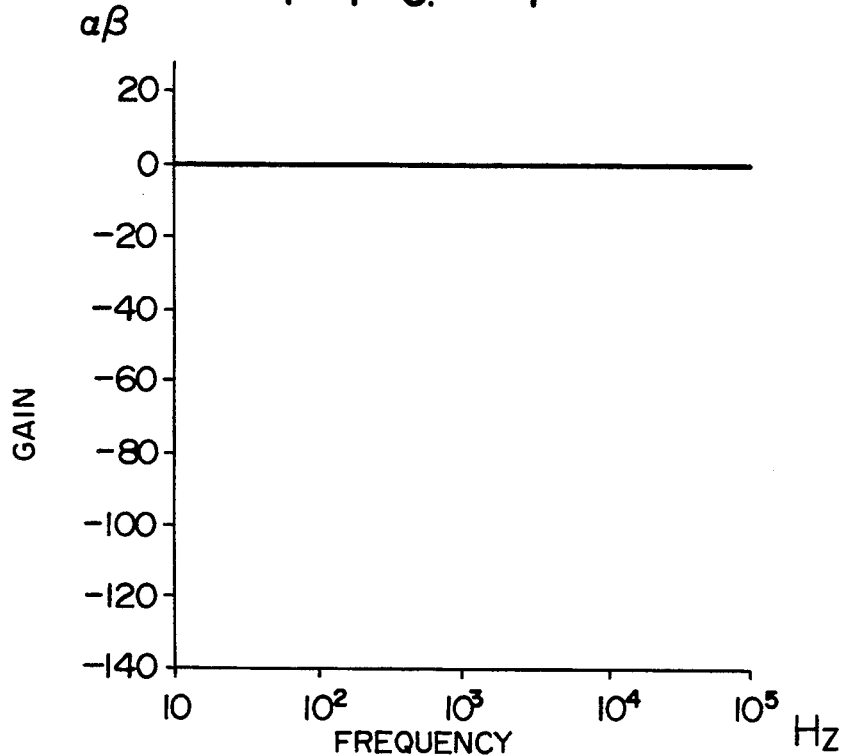
FIG. 4 is a graph showing an example of a characteristic of the A/O deflecting device used as the micro moving mechanism in the present invention.

Referring to FIG. 4, there is illustrated an example of a characteristic of the A/O deflecting elment used for the micro moving mechanism in the present invention. The A/O deflecting element is such that as mentioned previously, the deflection angle θ can be changed by changing the frequency f and also the frequency f can be changed electrically by the high-frequency source, thus permitting a high speed operation and maintaining the gain constant at 0 dB up to high frequencies. Also, there is no secondary resonance as in the case of the mechanical actuator. Thus, differing from the mechanical actuator such as a galvano-mirror used in the conventional optical disc memory apparatus, the A/O deflecting element can operate at a high speed and thus the light spot can be moved rapidly. In addition, the deflection angle of the light beam is determined by the frequency applied to the A/O deflecting element and therefore the amount of movement of the light spot can be determined accurately.

While, in the present embodiment, the A/O deflecting element is used for the micro moving mechanism, the invention is not limited to the A/O deflecting element so that it is only necessary to use any element such as an SAW element which is not mechanical deflecting element and therefore it is only necessary to use a moving mechanism having a given amplitude characteristic such that the gain is not varied up to such high frequencies over 10 KHz.

Figure 5A:
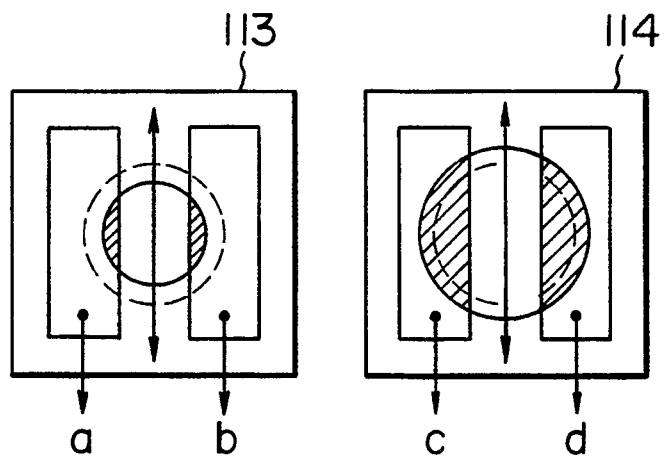
FIGS. 5A and 5B show respectively detectors for detecting a focus error signal and a data signal, respectively, and a signal detecting system for the signals.
Figure 5B:
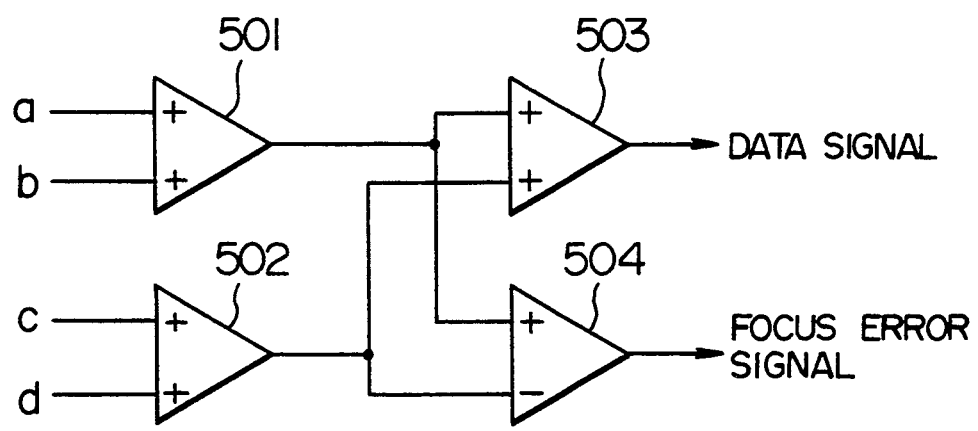

In the present embodiment, the detection of a focus error signal is effected by use of the front-to-back differential method. As shown in FIG. 1, this is one in which the detectors 113 and 114 are respectively arranged before and back of the focal point of the convex lens 10 and the differential of their output signals is taken, and this is the well known technique by for example U.S. Pat. No. 4,742,218. FIGS. 5A and 5B show a focus error signal detecting system.

With the consruction of FIG. 1, when the light beam is deflected by the light deflector 104, the light spots on the detectors 113 and 114 are also moved. Thus, it is necessary to set the directions of arrangement of the detectors 113 and 114 as shown in FIG. 5A with respect to the deflecting direction of the light beam by the light deflector 104 thereby preventing any interference to the focus error signal. In other words, each of the detectors 113 and 114 is composed of a bisplitting (2-divided) detector which detects only the peripheral portions of the light spot projected onto its detection surface and whose splitting zone is arranged parallel to the deflecting direction (shown by the arrow) of the light beam by the light deflector 104. By so doing, even if the light spot on the detector 113 or 114 is moved in the direction of the arrow by the light deflector 104, there is no variation in the quantity of light received by detecting portions a and b or c and d provided on the sides of the splitting zone and thus the effect of moving the light spot by the light deflector 104 can be eliminated. Also, a data playback (reproducing) signal can be generated by use of the signals from the detectors 113 and 114. The construction of the signal processing system is shown in FIG. 5B. In other words, the two outputs of the bisplitting (2-divided) detector 113 are added by an adder 501 and the two outputs of the biplitting (2-divided) detector 114 are added by an adder 502. Then, the outputs of the adders 501 and 502 are added by an adder 503 to generate a data playback (reproducing) signal, and the difference between the outputs of the adders 501 and 502 is produced by a differential amplifier 504 to generate a focus error signal. The data playback signal is applied to a demodulator for demodulation. Also, the focus error signal is applied to an actuator for moving the converging lens 108 in the direction of its optical axis and the distance between the converging lens 108 and the optical disc 10 is adjusted in such a manner that the focal point of the light spot projected from the converging lens 108 coincides with the information recording surface of the optical disc 10.

Figure 6A:
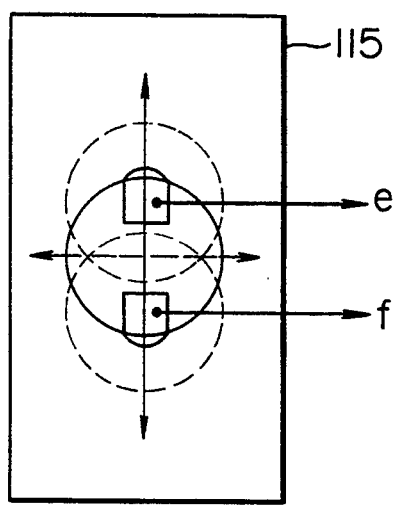
FIGS. 6A and 6B are diagrams showing respectively a detector for detecting a track error signal and its signal detecting system.
Figure 6B:
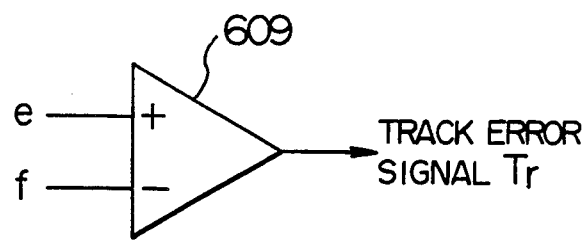

The diffracted light tracking system (push-pull system) is used for the detection of a track error signal. This technique is also well known in the art. For instance, reference is made to U.S. Pat. No. 4,525,826. The shape of the detector 115 is shown in FIG. 6A and its signal processing system is shown in FIG. 6B. In FIG. 6A, the solid-line arrow indicates the directions of deflection of the light by the light deflector 104 and the broken-line arrow indicates the directions of the track projected on the detector 115. The detector 115 includes two detecting portions e and f which are symmetrically arranged with respect to the track directions and are arranged in the interference regions of the zero-order diffracted light and the ±first-order diffracted light due to the track. Then, a track error signal Tr is produced by differentiating the two outputs of the detector 115 by a differential amplifier 609 as shown in FIG. 6B. As in the case of the detection of a focus error signal, when the light beam is deflected by the light deflector 104, the light spot on the detector 115 is also moved as shown in FIG. 6A. As a result, an offset is introduced into a track error signal in accordance with the deflection angle of the light beam.

Figure 7:
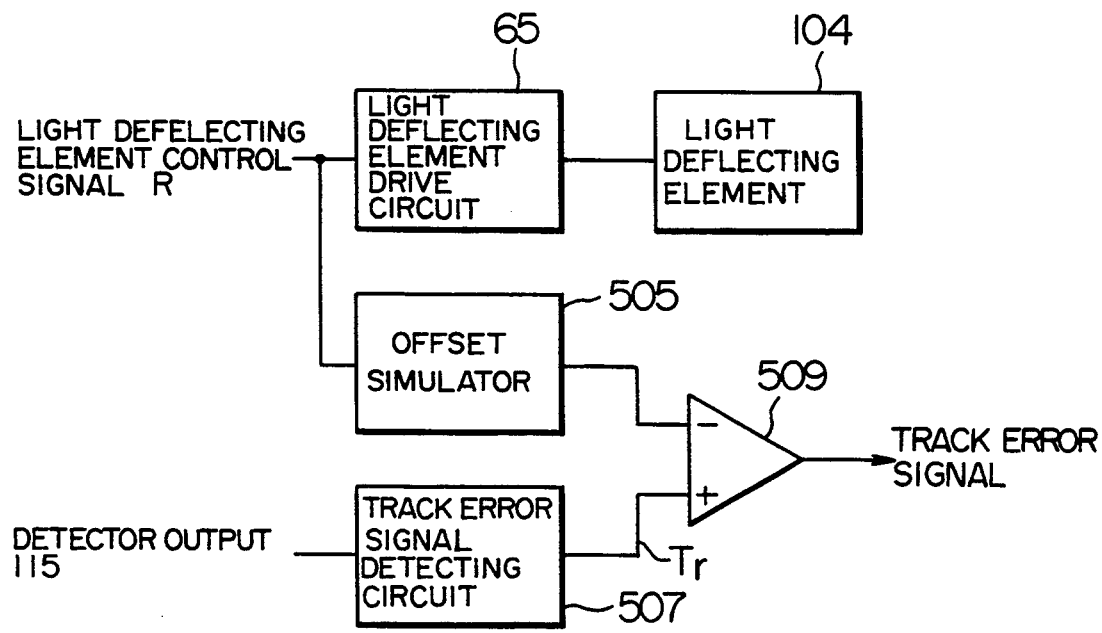
FIG. 7 is a block diagram showing a first method for correcting the offset of a track error signal.

The methods of correcting the offset in the track error signal will now be described. The first method is designed so that the relationships between the light beam deflection angles by the light deflector 104 and the offset amounts have been preliminarily determined by computation or actual measurements and stored and a track error signal is corrected in accordance with the deflection angle of the light beam. This method is shown in FIG. 7. Using a control signal R for the light deflector 104, a simulator 505 simulates an offset and a differential amplifier 509 differentiates the simulated offset and the output of a track signal detecting circuit 507 (the differential amplifier 609 of FIG. 6B), thus correcting the track error signal detected by the track error signal detecting circuit 507 to generate a corrected track error signal Tr'. It is to be noted that the light deflector 104, e.g., the A/O deflecting element 118 is driven by an optical deflecting element drive circuit 65 to which the control signal R is applied. With this method, there is the possibility of the correction being made impossible in cases where an offset is produced by any cause other than the deflection of the light beam by the light deflector 104.

Figure 8A:
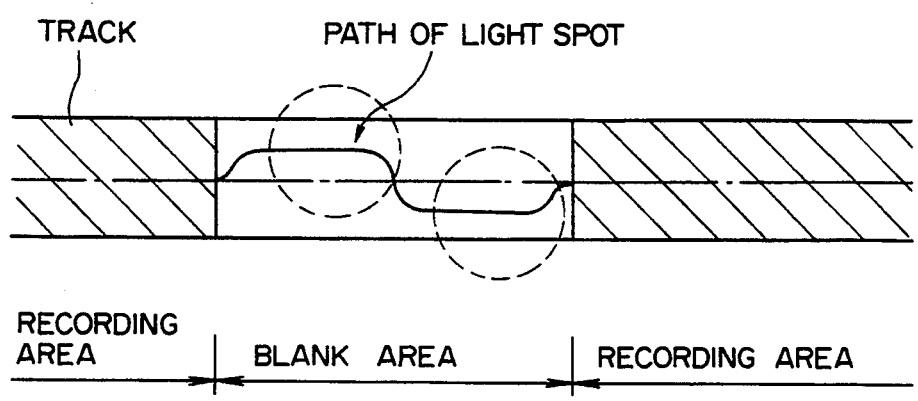
FIGS. 8A and 8B are diagrams showing a second track offset correcting method.

The second method of correcting the offset in the track error signal is such that with blank areas without data being formed intermittently on each track of the optical disc 10 as shown in FIG. 8A, the light spot is wobbled about the track to determine the amount of a track error and the track error signal Tr detected by the track error detecting circuit (the differential amplifier 609) is corrected in accordance with the amount of the track error, thereby producing a corrected track error signal Tr' with no offset. The wobbling method has been disclosed in JP-A-49-94304 and JP-A-50-68413 and therfore its explanation will be omitted.

The offset correction of a track error signal Tr according to the present embodiment is made possible only through the use of a non-mechanical light deflector such as an A/O deflector or SAW element for the micro moving mechanism. The conventional mechanical actuators have been disadvantageous in that high-speed wobbling is not possible and that the light spot is deflected even in the data areas (the recorded areas).

Figure 8B:
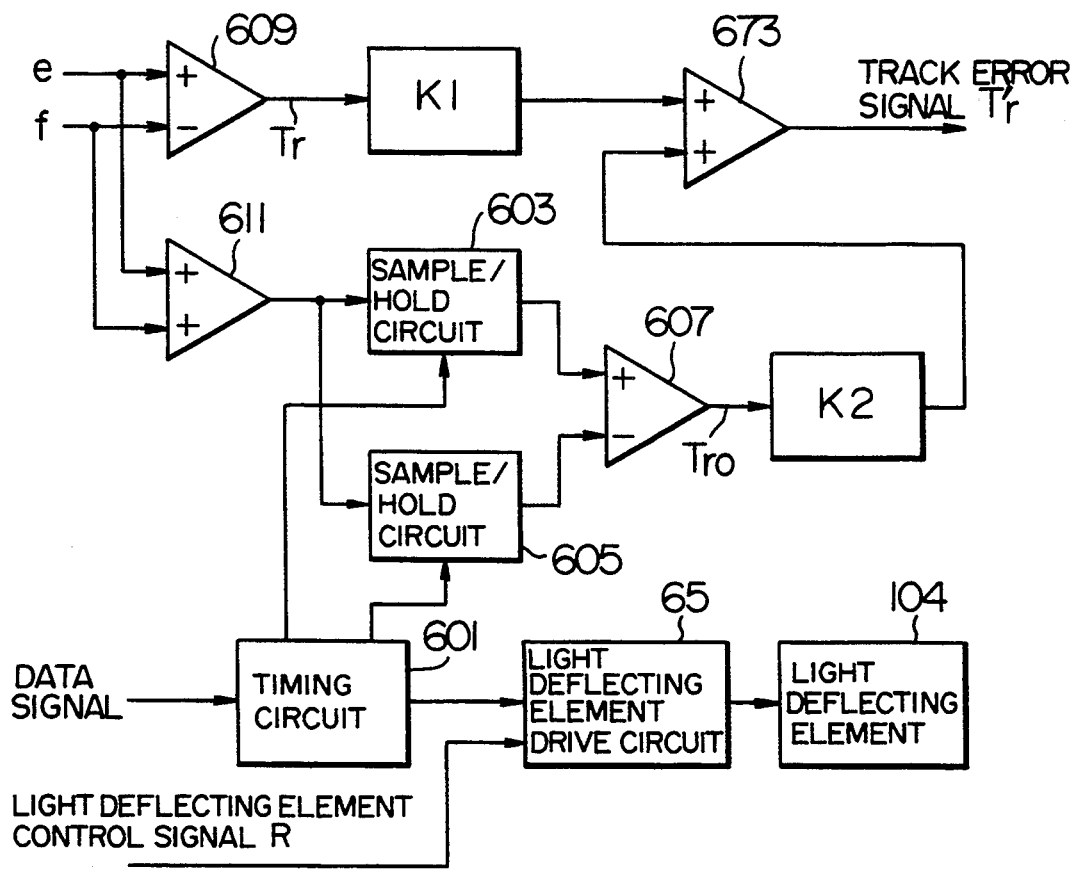

The construction of the offset correcting circuit is shown in FIG. 8B. A track error signal Tr produced by the ordinary diffracted light tracking is corrected by a track error signal Tro produced by the wobbling.

A timing circuit 601 generates a light spot wobbling signal when the light spot is positioned at any blank area and a light deflector drive circuit 65 is driven. The amount of wobbling of the light spot should preferably be ¼ of the track pitch. While, for instance, the amount of wobbling about the track should preferably be on the order of 0.4 $\mu$m when the track pitch is 1.6 $\mu$m, in fact the wobbling amount is generally on the order of 0.15 $\mu$m in consideration of vignetting by the converging lens 108 and the like. The difference between the outputs e and f of the detector 115 is determined by the differential amplifier 609. And the sum of the outputs e and f of the detector 115 is obtained by an adder 611 and the sum is applied to sample/hold circuits 603 and 605. The timing circuit 601 also generates control signals for the sample/hold circuits 603 and 605. The pair of sample/hold circuits 603 and 605 respectively store the reflected light quantities corresponding to the movements of the light spot to the sides of the track and their difference is obtained by a differential amplifier 607, thus producing a track error signal Tro by the wobbling and thereby applying it to an adder 613 through a gain adjuster $K_2$. The tracking error signal Tr by the diffracted light tracking or the output Tr of the differential amplifier 609 is applied to the other input of the adder 613 through a gain adjuster $K_1$. By changing the values of gains $K_1$ and $K_2$, it is possible to change the ratio between the error signal Tr by the diffracted light tracking and the error signal Tro by the wobbling. Where $K_1=0$, there results the equivalent tracking opration to the sample servo. The offset-corrected track error signal Tr' is applied to a tracking control circuit 45 as will be described later so that the signal is phase compensated to produce a micro following control signal (light deflecting element control signal) R and a macro following control signal (coarse actuator control signal) G, and the micro following control signal (light deflecting element control signal) R drives the micro moving mechanism (light deflecting element) through the micro moving mechanism (light deflecting element) drive circuit 65.

Figure 9:
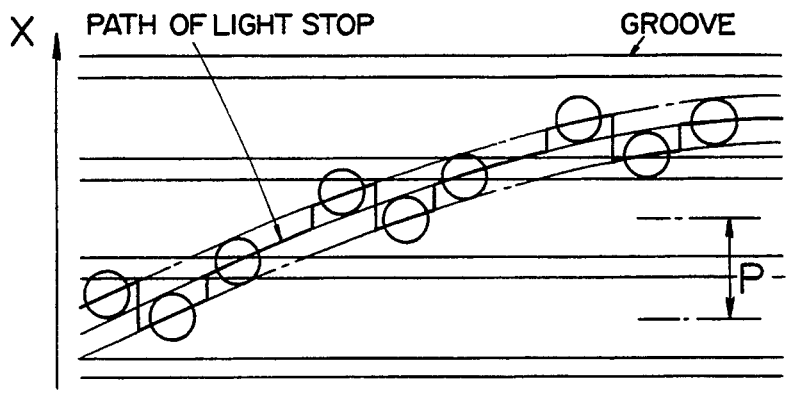
FIGS. 9, 10A and 10B are diagrams showing a third method of correcting the offset of a track error signal.

The third method of correcting the offset in a track error signal will now be described. As shown in FIG. 9, this method is to discretely wobble (oscillate) the light spot to cancel the offset component from the track error signal. Let it be assumed that w represents the position of the light spot in the disc radial direction, and p the track pitch. Assuming that Tr represents a track error signal including an offset, then the signal is given by the following equation $$Tr = a \sin(2\pi x/p) + b$$

Here, designated as a is the amplitude of the track error signal and b the offset. Assuming that designated by ±w are the amounts of movement of the light spot by the wobbling and E+ and E− the corresponding track error signals Tr, then the sum of E+ and E− is given by the following equation $$E^+ + E^- = 2\{a \sin(2\pi x/p) \cos(2\pi w/p) + b\}$$

Thus, by performing the following computation, it is possible to obtain a track error signal Tr′ having the offset cancelled $$\begin{aligned}Tr' &= (E^+ - E^-)/2 \\ &= a\{1 - \cos(2w/p)\}\sin(2\pi x/p)\end{aligned}$$

Generally, it is selected w=p/2 so that the amplitude of the error signal Tr′ becomes maximum.

Figure 10A:
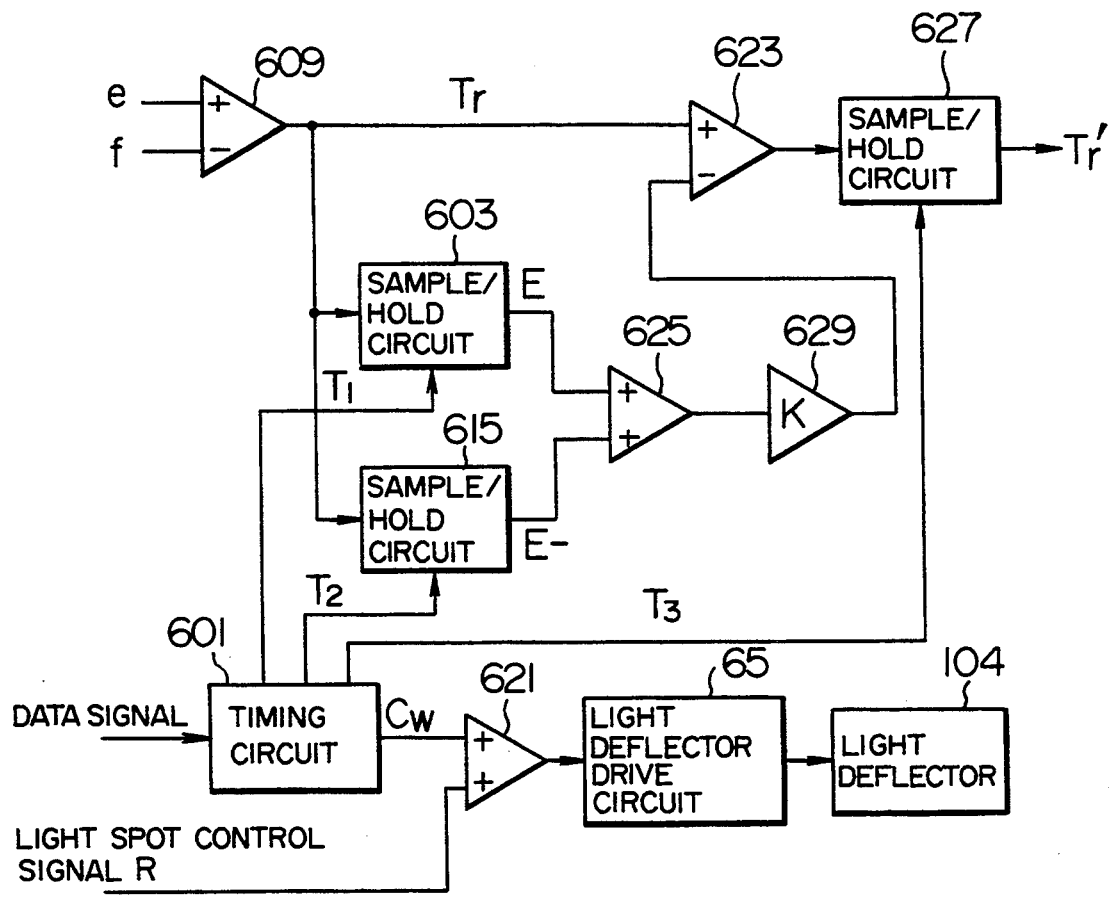
Figure 10B:
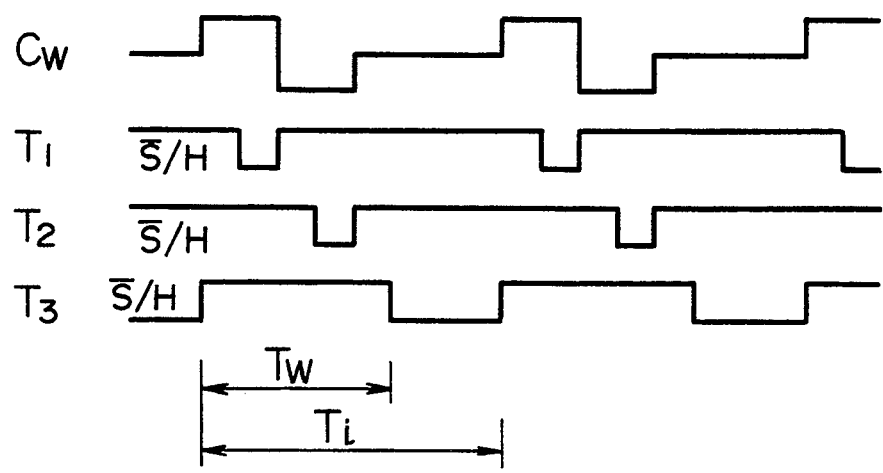

FIG. 10A shows the construction of the offset correcting circuit and FIG. 10B shows the waveforms of control signals for the correcting Circuit. The differential amplifier 609 produces the sum of the outputs e and f of the bisplitting detector 115, thereby producing a track error signal Tr by the diffracted light tracking (push-pull).

A timing circuit 601 generates a wobbling control signal Cw and control signals $T_1$, $T_2$ and $T_3$ for sampling and holding purposes.

The light spot is wobbled by the wobbling control signal Cw. In other words, the wobbling control signal Cw is combined with the light spot control signal R from the servo system by an adder 621 to drive the light deflector (the micro moving mechanism) 104 through the light deflector (the micro moving mechanism) drive circuit 65. While, in the case of the conventional mechanical actuator, the amounts of movement of the light spot must be detected and fed back in order to wobble the light spot by a given amount, in the case of a non-mechanical light deflector such as an A/O deflecting element or SAW element, a change of the driving frequency f is proportional to a change of the deflection angle θ and therefore the wobbling can be effected without providing feedback.

When the wobbling is effected, the resulting track error signals E+ and E− are respectively sampled and held by the sample/hold circuits 603 and 605 which are controlled by the control signals $T_1$ and $T_2$, respectively. Since the propagation of ultrasonic wave through the medium of the light deflector requires much time, the sampling signal $T_1$ and $T_2$ are generated with delays from a change of the wobbling control signal $C_w$. The sum of the outputs from the sample/hold circuits 603 and 605 is obtained by an adder 625 and it is then applied to a differential amplifier 623 through a gain adjuster K. The output Tr of the differential amplifier 609 is applied to the other input of the differential amplifier 623 so that the offset component in the error signal Tr by the diffracted light tracking is corrected and the offset-corrected track error signal Tr′ is produced. A sample-hold circuit 627 is controlled by the control signal $T_3$ so that during the wobbling period Tw the preceding offset-corrected track error signal Tr′ is held to prevent any oscillation of the servo system due to the control signal $C_w$. The gain adjuster K is preset so that K=½.

The wobbling period Tw should preferably be as short as possible. Since the light deflecting element operates rapidly, generally the period Tw can be reduced to less than 10 μs. While the interval Ti of the wobbling can be varied within the range of Ti>Tw, if the interval Ti is excessively large, the phase delay of the track error signal is also increased and therefore the interval Ti is set to fall within the following range in consideration of the stability of the control system $$Tw < Ti < 1/(3.2\pi fcf)$$

Here, designated by fcf is the band of the micro control system.

During the track access period, the band of the micro control system must be increased as will be described later and therefore the wobbling interval Ti is reduced as far as possible within the range of Tw<Ti. During the track following period, the band of the micro control system need not be increased much and thus the wobbling period Tw can be increased. Particularly, during the period of data read/write, the reading and writing of data cannot be effected if the light spot is wobbled. Thus, as shown in FIG. 8A, the blank areas without data are periodically formed on each track of the optical disc and the light spot is wobbled about the track in the blank area. In this case, the timing circuit 601 of FIG. 10A detects the blank area while checking for example the data signal to generate a wobble control signal $C_w$ and sample-hold control signals $T_2$, $T_2$ and $T_3$. If Ti represents the intervals at which the blank areas appear and if it is selected as long as possible so far as the condition of Ti<1/(3.2π.fcf) is satisfied, it is possible to decrease the reduction in the record areas due to the provisions of the blank areas.

For instance, if the bandwidth of the micro control system is selected 10 KHz during the track pull-in period, the wobbling interval Ti may be selected as short as possible within the range of Tw<Ti<33 μs. If the bandwidth of the micro control system is selected 3 KHz during the track following period, the wobbling period Tw may be selected as long as possible within the range of Ti<110 μs.

While, in the above-described embodiments, the diffracted light tracking is employed for the detection of a track error signal Tr, it is possible to wobble the light spot to detct a track error signal according to the total light quantity of the reflected light from the optical disc. An example of this method will now be described.

Figure 11A:
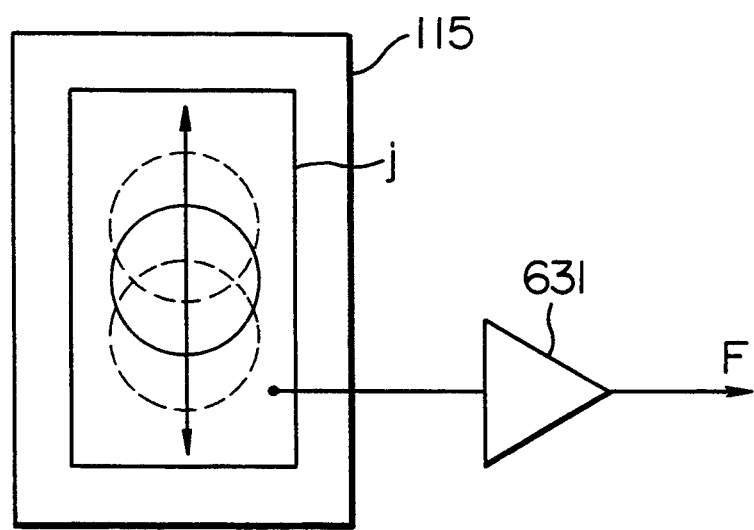
FIGS. 11A, 11B and 11C are diagrams showing respectively a detector for detecting the total light quantity of reflected light and the construction and timing of a circuit for detecting a track error signal from the reflected light quantity.

The manner in which the light spot is wobbled is the same with that shown in FIG. 9. In this embodiment, the track error signal detecting detector 115 used includes a detecting element j as shown in FIG. 11A. In order to detect the total quantity of the reflected light, the detecting element j is made larger than the light spot of the reflected light and also it is made long in the light deflecting direction of the light deflector 104 so as to cover the light spot even if it is moved as indicated by the broken lines by the light deflector 104. The output of the detector 115 is amplified by an amplifier 631 to generate a total light quantity signal F.

The method of detecting an offset-free track error signal Tr′ from the total reflected light quantity signal F will now be described. In FIG. 9, let it be assumed that x designates the position of the light spot in the disc radial direction and p the track pitch. Assume that the total reflected light quantity signal F is given by the following equation $$F = c \cos(2\pi x/p) + d$$

Here, c is the amplitude component of the total light quantity signal and d is the dc component. Assuming that ±w represent the amounts of movement of the light spot due to its wobbling and F+ and F− the corresponding total light quantity signals, a track error signal Tr' can be produced by determining the difference between F+ and F−.

$$Tr' = F^+ - F^-$$
$$= -2c\sin(2\pi w/p)\sin(2\pi x/p)$$

Generally, it is selected so that $w=p/4$ in order that the amplitude of Tr' becomes maximum.

Figure 11B:
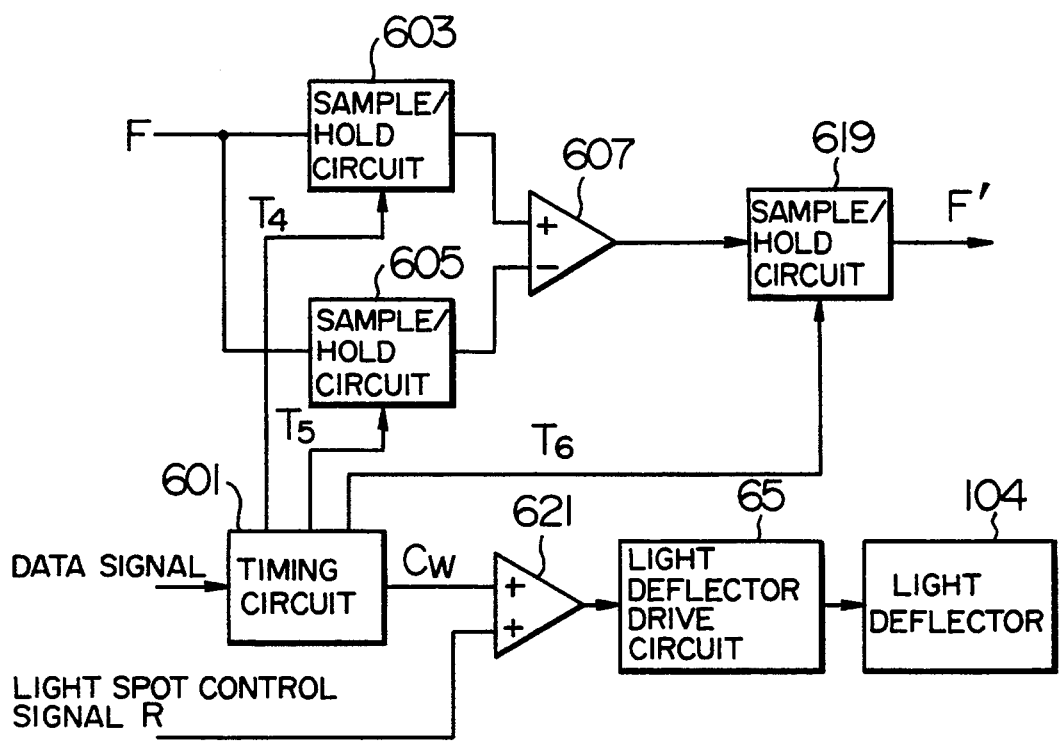
Figure 11C:
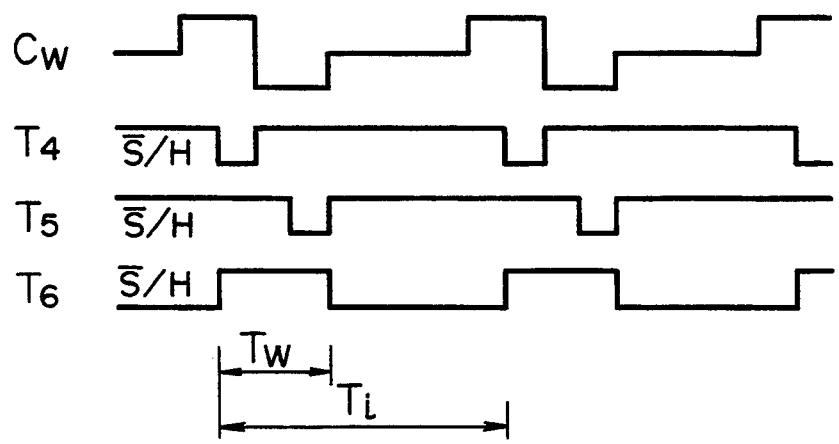

In this case, the track error signal detecting circuit is constructed as shown in FIG. 11B and the waveforms of control signals are shown in FIG. 11C. The timing circuit 601 generates a wobbling control signal Cw and sample/hold control signals $T_4$, $T_5$ and $T_6$.

The method of wobbling the light spot according to the control signal Cw is the same as described with reference to FIG. 10.

When the wobbling is effected, the resulting total light quantity signals F+ and F− are respectively sampled and held by the sample/hold circuits 603 and 603 which are controlled by the control signals $T_4$ and $T_5$, respectively. The propagation of ultrasonic wave through the medium of the light deflector 104 requires considerable time and therefore the sampled signals $T_4$ and $T_5$ are generated later than a change in the wobbling control signal Cw. A sample/hold circuit 619 is controlled by the control signal $T_6$ so that during the wobbling period Tw the track error signal is held and the servo system is prevented from oscillating.

The wobbling period Tw and the wobbling interval Ti are set in the same manner as described in connection with the offset correction in the diffracted light tracking and therefore will not be described.

Figure 12A:
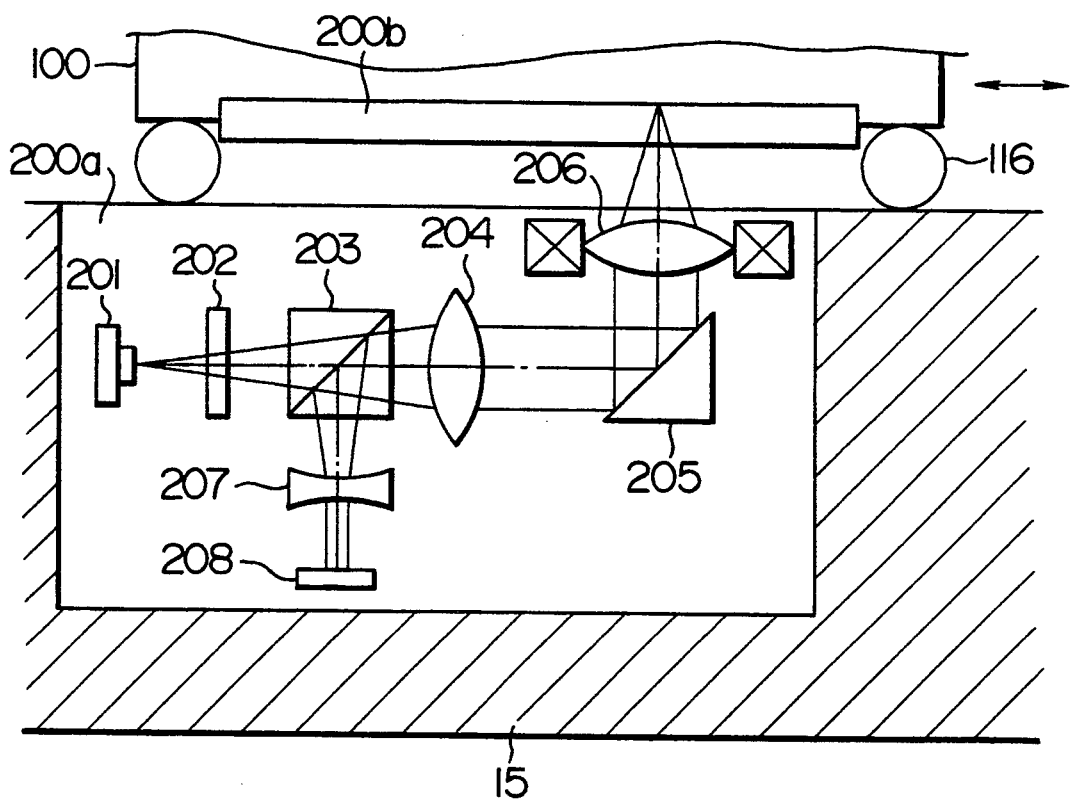
FIGS. 12A, 12B, 12C and 12D are diagrams showing respectively the construction of a micro-pitch laser scale, its output, the arrangements of light spots on the scale and a signal detecting system.

As shown in FIG. 12A, the laser scale includes a micro-pitch scale 200b mounted on the optical head 100 and a fixed optical system 200a mounted on the base 15. The micro-pitch scale 200b is formed with grooves of about the same pitch as the track pitch of the optical disc 10 so that the laser beam is converged through the fixed optical system 200a and the resulting reflected light is detected. The laser beam emitted from a laser diode 201 is passed through a diffraction grating 202 and a half mirror 203 and converted into a collimated beam by a collimating lens 204. After the reflection by a reflecting mirror 205, the collimated beam is converged by a lens 206 thereby focusing three light spots on the micro-pitch scale 200b. The reflected light is separated by the half mirror 203, formed into a collimated beam by a concave lens 207 and directed to a detector 208.

Figure 12B:
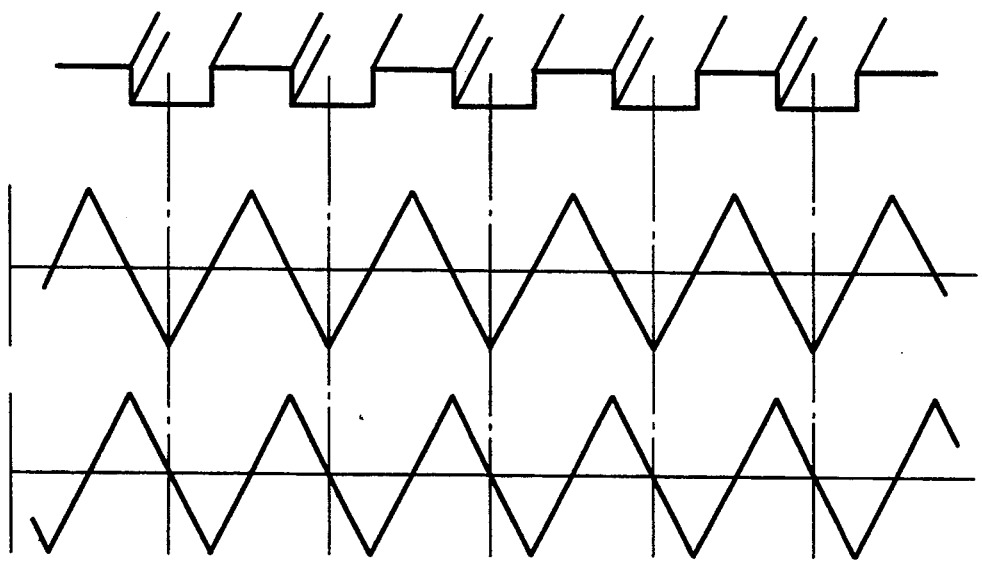
Figure 12C:
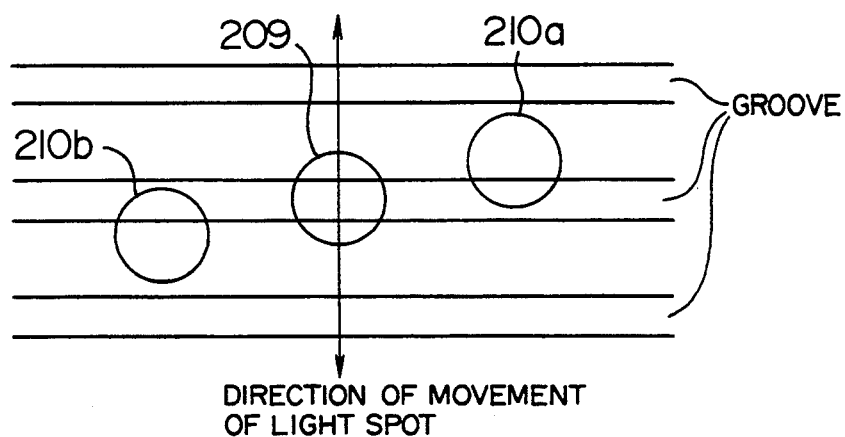
Figure 12D:
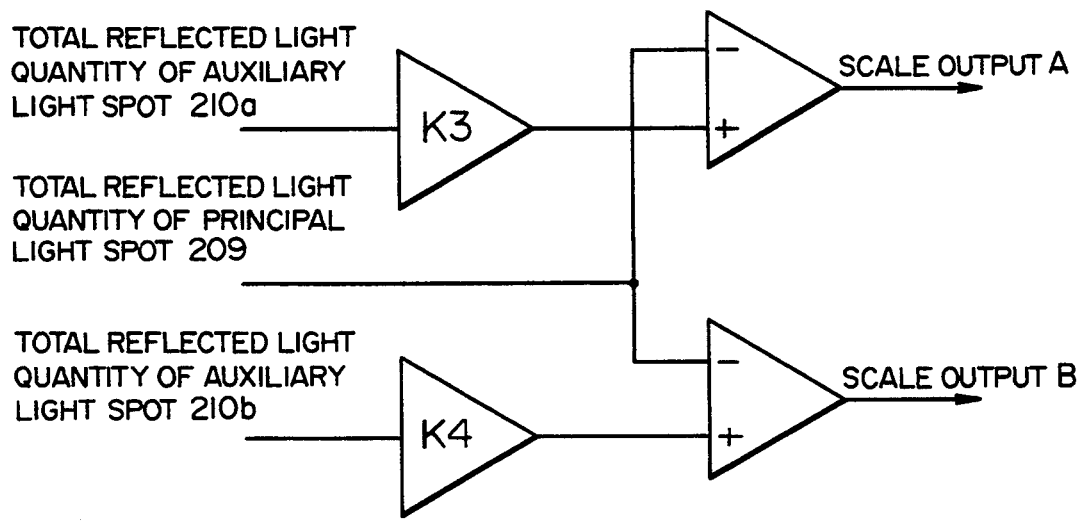

In order to detect the amount, rate and direction of movement of the head, it is only necessary to generate two signals having a phase difference of π/2 therebetween as shown in FIG. 12B. The previously mentioned three light spots are arranged with respect to the groove of the micro-pitch scale 200b as shown in FIG. 12C. In other words, two auxiliary light spots 210a and 210b are arranged on both sides of a principal light spot 209 so that their reflected light quantities are respectively displaced in phase by about ±π/2 with respect to the reflected light quantity of the principal light spot 209. By correcting the reflected light quantity signals of the three light spots by the circuit shown by the block diagram of FIG. 12D, it is possible to obtain two signals having a phase difference of about π/2 as shown in FIG. 12B. In FIG. 12D, the components $K_3$ and $K_4$ respectively make up the difference between the reflected light quantity of the principal light spot 209 and those of the auxiliary light spots 210a and 210b. While the method employing the three light spots has been described, it is possible to generate signals such as shown in FIG. 12B by use of the reflected light quantity and the diffracted light of a single spot.

While, in the foregoing description, the position of the optical head is detected by use of the laser scale, the track crossing direction and speed of the light spot can be detected by use of the reflected light of the light spot. This method will now be described. In order to know the track crossing direction of the light spot, it is only necessary to generate two signals having a 90-degree phase displacement from each other.

Simultaneously with the production of the offset-free track error signal Tr' from the track error signal Tr by the tracking signal detecting system shown in FIG. 10, in the tracking detecting system shown in FIG. 11 the track error signal Tr is used in place of the total reflected light quantity signal F thereby producing an offset-free cross track signal Tr'' having a 90-degree phase displacement from the offset-free track error signal Tr'. Thus, both the offset-free track error signal Tr' and the offset-free cross-track signal Tr'' can be used for the purpose. Particularly, this method is effective in cases where light intensity variations are utilized in the reproduced signal of information as in the case of optical magnetic recording or where the frequency of cross count signals is so low that they are separated in band from information signals. In this case, if the track error signal Tr is given by the following equation as mentioned previously $$Tr = a\sin(2\pi x/p) + b$$

then the resulting cross track signal Tr'' is given as follows $$Tr'' = 2a\sin(2\pi w/p)\cos(2\pi x/p)$$

If it is selected so that $w=p/2$, the amplitude of Tr is reduced to zero and the value of w is generally selected to fall in the range of $0 < w < p/2$.

Also, while obtaining an offset-free track error signal Tr' from the total reflected light quantity signal F by the tracking signal detecting system shown in FIG. 11, the total reflected light quantity signal F can be used in place of the track error signal Tr in the system shown in FIG. 10, thereby producing an offset-free cross track signal Tr'' having a 90-degree phase displacement from the offset-free track error signal Tr'. In this case, if the total reflected light quantity signal F is given by the following equation as mentioned previously, $$F = c\cos(2\pi x/p) + d$$

then the resulting cross track signal Tr'' is given as follows $$Tr'' = c\{1-\cos(2\pi w/p)\}\cos(2\pi x/p)$$

If it is selected so that $w=p/2$, the amplitude of the signal Tr' is reduced to zero and therefore the value of w is generally selected to fall within the range of $0 < w < p/2$.

Next, the method of realizing a high-speed seek by using the optical head of the construction shown in FIG. 1 will be described.

Figure 13A:
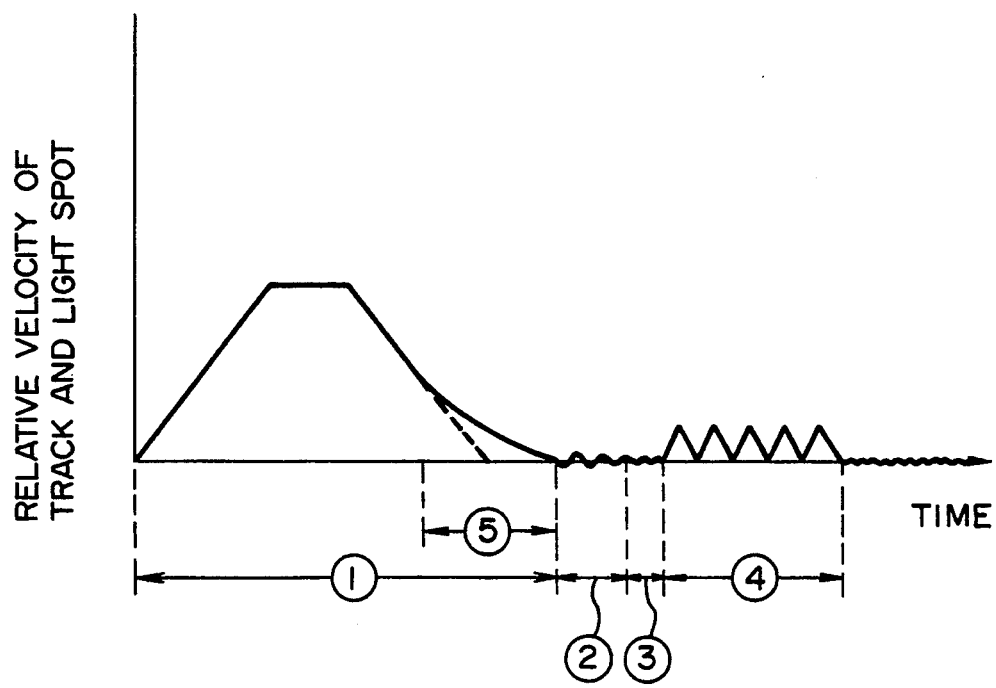
FIGS. 13A and 13B are diagrams for explaining the conventional two-stage seek.

The two-stage seek method for optical disc memory has been disclosed in the previously mentioned JP-A-58-91536, JP-A-58-169370 add U.S. Pat. No. 4,607,358. When considered in terms of a seek time, the two-stage seek method is designed as shown in FIG. 13A. In other words, the total seek time is the sum total of ① the time required for a macro seek, ② the time required for a track pull-in operation required for the setting and starting the track following servo, ③ the time required for confirming the track address and ④ the time required for a micro seek. In the case of the magnetic disc memory apparatus, conversely the track pitch is coarse and there is no need to perform such two-stage seek as in the optical disc memory apparatus. In other words, the positioning can be effected only by use of a linear motor which corresponds to the macro moving mechanism of the optical disc memory apparatus and therefore there is no need to perform the micro seek of ④ in FIG. 13A.

Where it is desired to realize about the same high-speed seek as in the optical disc memory apparatus of the conventional construction, the following problems are encountered. ① If the optical disc is driven at a high acceleration in order to reduce the time required for the macro seek of ①, the residual vibrations after the completion of the macro seek movement are increased. Thus, it is necessary to wait for the residual vibrations to come to an end and the setting time of ② is increased. Also, in order that the starting of the track following servo may be effected, the relative velocity of the track and the light spot on the disc must be reduced so as to permit the track pull-in. However, the track pitch of the optical disc is so small that it is necessary to wait until the relative velocity is decreased further as compared with the case of the magnetic disc. Thus, in view of the residual vibration problem or the problem of velocity error which will be described later, in the optical disc memory apparatus the decelerating acceleration must be decreased gradually as in ⑤ of FIG. 13A and the time required for the macro seek of ① is increased correspondingly. Also, where the rotation velocity of the disc is high and the eccentricity of the disc is large, there is the danger of the relative velocity of the track and the light spot on the optical disc is increased so that even if the track following servo is started to read the address after the setting of the macro seek, the track is caused to run out and the time ② required for the track following operation to actually start is increased. As regards the positioning accuracy of the optical head, the resolution of the linear scale is inferior to the track pitch so that not only a rounding error is caused but also a deviation is caused due to shifting of the target position itself during the macro moving owing to the eccentricity during the disc rotation, thereby causing the position of the light spot after the macro moving to deviate from the proper target. As a result, the correction distance by the second-step micro seek is increased and also the micro seek time of ④ is increased due to the increased correction distance coupled with the fact that the micro moving mechanism comprises a mechanical actuator.

In view of these deficiencies, the seek time of the optical disc memory apparatus is slowed down as compared with the magnetic disc memory apparatus. For instance, if one half of all the tracks is to be seeked in a 14" magnetic disc memory apparatus, the seek is completed in a total time of about 15 msec including about 14 msec for the macro seek of ① and 1 msec for the setting and the starting of the track following servo of ②. On the contrary, a 12" optical disc memory apparatus requires the total seek time of about 200 msec including about 100 msec for the macro seek of ①, about 50 msec for the setting and the starting of the track following servo of ② and about 50 msec for the micro seek of ④.

Figure 14A:
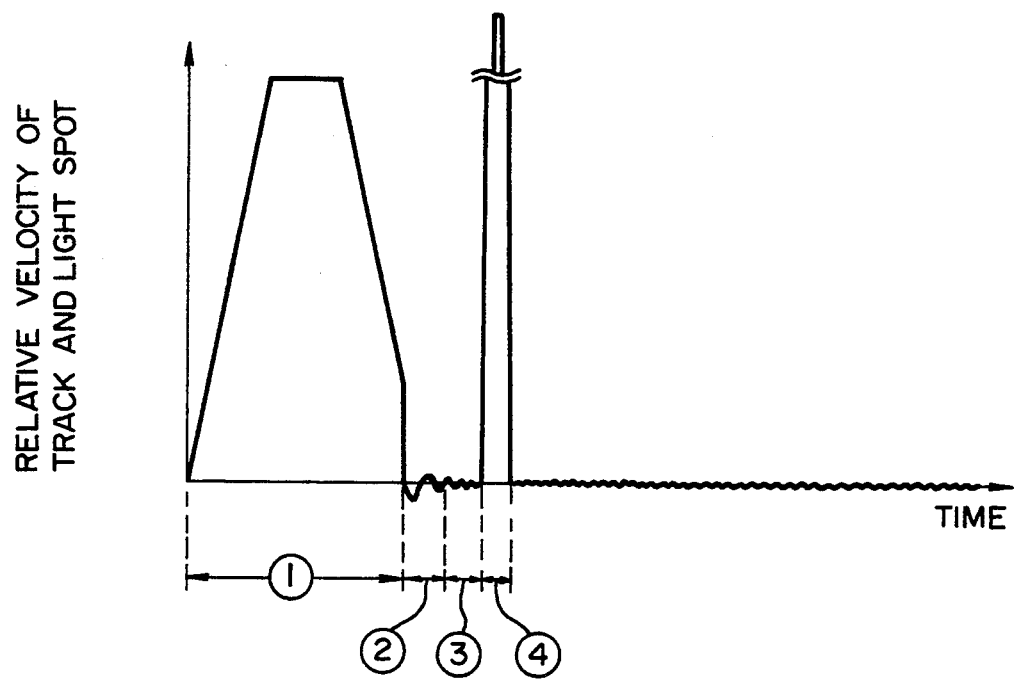
FIGS. 14A and 14B are graphs for explaining the seek time of the two-stage seek according to the invention.

FIG. 14A shows the seek time by the light spot positioning method according to the present invention, and FIG. 15 shows the movements of the optical head and the light spot. The light spot is rapidly controlled by use of the non-mechanical light deflector 104 including for example an A/O deflecting element or SAW element and mounted on the optical head or the base as the micro moving mechanism.

A high-thrust actuator 20 is used for the macro moving mechanism for driving the optical head 100 thereby applying an acceleration of about the same or greater than that of the magnetic disc memory apparatus. By so doing, the time required for the macro seek of ① can be reduced as shown in FIG. 14A. The reason for making possible the application of an acceleration of about the same or greater than that of the magnetic disc memory apparatus is as mentioned below.

At the time of completion of the macro seek, the macro moving mechanism should have been decelerated to a velocity which permits the track pull-in by the light deflector forming the micro moving mechanism. Where fv represents the band of the velocity control system of the macro seek and α represents the decelerating acceleration, the following relation exists between them and the deviation Ve from the velocity set point.

$$Ve = \frac{\alpha}{2\pi fv}$$

If $\alpha = 25$ G when fv = 700 Hz, then the following results

VE ≈ 55 mm/sec.

Thus, even if the velocity curve is determined such that the velocity is reduced to zero at the target track for the macro seek, actually the velocity of Ve still remains.

Figure 13B:
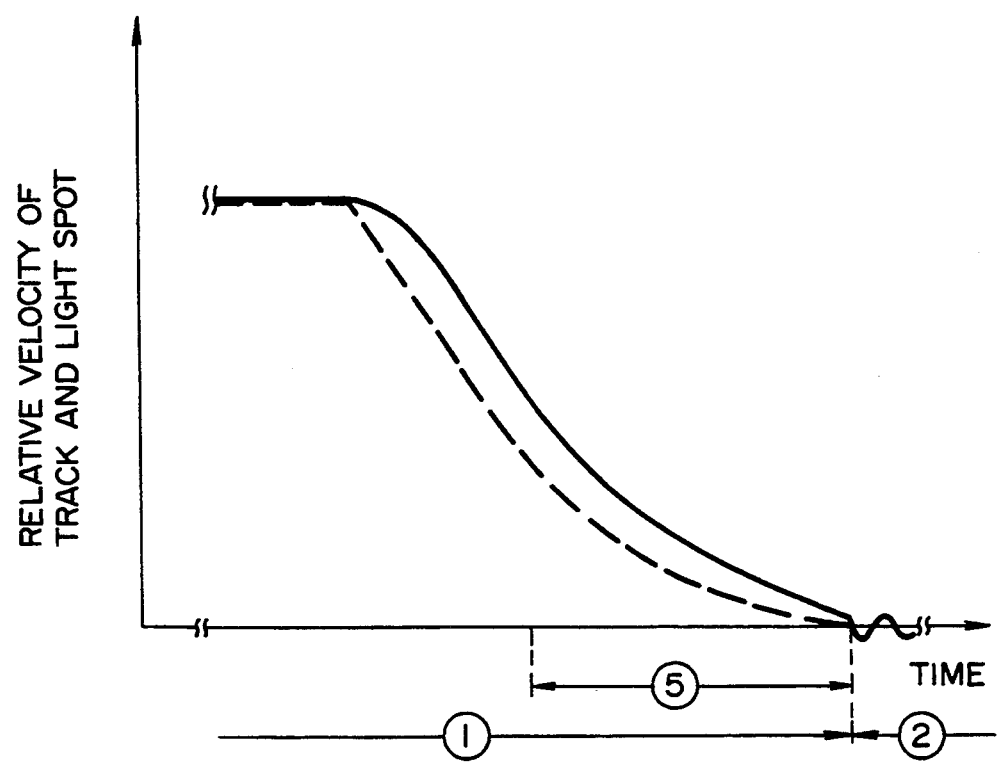

In the case of the conventional optical disc memory apparatus, the track cannot be pulled-in until the relative velocity between the track of the optical disc and the light spot reaches about 3 mm/sec. FIG. 13B shows the relative velocities of the track and the optical spot during the macro seek decelertion period in the conventional optical disc memory apparatus. The broken line represents a desired velocity curve and the solid line represents the actual velocities. The difference between the broken line and the solid line representes the velocity error Ve. Since the light spot cannot be brought to or pulled-in the target track if the velocity error Ve remains large, as shown at ⑤ in FIG. 13B, the decelerating acceleration is decreased as the light spot approaches the target track as shown at ⑤ in FIG. 13B and the light spot is pulled-in the target track upon velocity error Ve being reduced to a sufficiently small value of 3 mm/sec. The macro seek requires an extra time corresponding to the decrease in the decelerating acceleration. Also, the proportion of this extra time in the macro seek time is increased as the initial decelerating acceleration is increased.

Figure 14B:
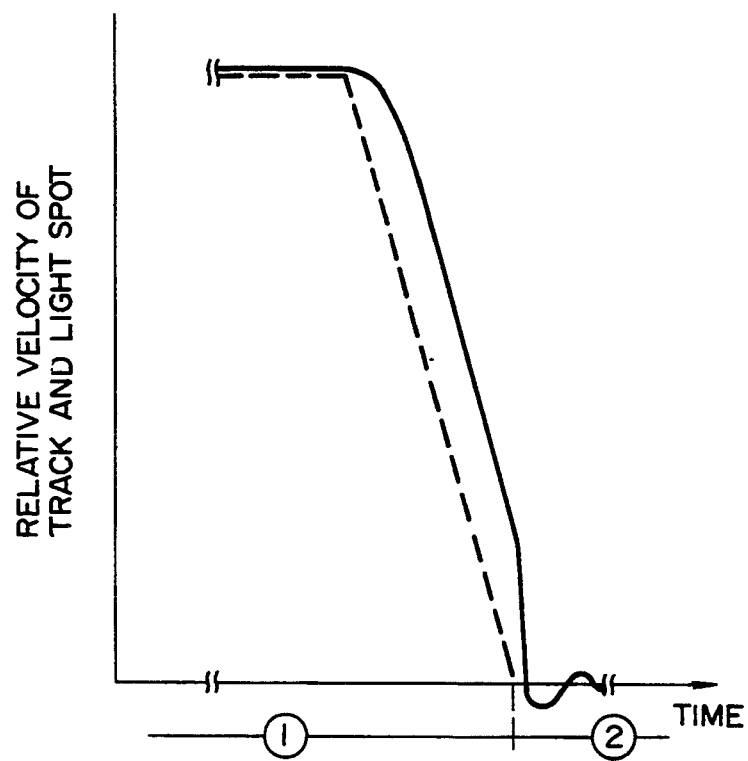

In accordance with the present invention, however, during the track pull-in operation the band of the control system of the micro moving mechanism is made higher than 10 KHz, e.g., higher than 12 KHz so that the track can be pulled-in even if the velocity error Ve is 55 mm/sec. FIG. 14A shows the whole cycle of the seek time according to the present invention and FIG. 14B shows the relative velocity of the track and the light spot during the period of macro seek deceleration. In FIG. 14B, the broken line indicates the desired velocity curve and the solid line indicates the actual velocities. The difference between the broken line and the solid line is the velocity error Ve. Since the track can be pulled-in with the velocity error Ve remaining large, there is no need to decrease the decelerating acceleration as in the case of FIG. 13B and no extra time is required, thereby reducing the time required for the macro seek of ①.

In accordance with the invention, while the optical head is driven at a high acceleration thus increasing the residual vibrations at the end of the macro seek, the residual vibrations can be suppressed by increasing the bandwidth of the control system of the micro moving mechanism and the setting time of ② can also be reduced.

Also, regarding the track pull-in operation for the setting and the starting of the track following servo, contrary to the case of the magnetic disc memory apparatus in which the track is pulled in by use of the linear motor corresponding to the macro moving mechanism of the optical disc thus making it impossible to increase the bandwidth of the control system, in accodance with the invention the bandwidth of the control system of the micro moving mechanism can be made higher than 10 KHz during the track pull-in operation and thus the operation can be completed in a shorter time than in the case of the magnetic disc memory apparatus.

As regards the micro seek of ④, it can be effected at a higher velocity than previously by increasing the bandwidth of the micro moving mechanism. Also, if a non-mechanical light deflector such as an A/O deflecting element or SAW element is used for the micro moving mechanism, the absolute amount of movement (the number of tracks) of the light spot in response to a change in the applied frequency can be known. Therefore, the moving operation of the micro seek can be completed at a time. Also, only several μsec are required until the movement of the optical spot is actually completed after the applied frequency has been changed. As a result, the time ④ required for the movement of the micro seek is practically negligible as compared with the time for the seek on the whole.

The linear scale heretofore used for detecting the amount and velocity of movement of the optical head has included light-emitting diodes and slits having a pitch of about 100 μm and therefore the resolution attainable by effecting the frequency division has been on the order of 10 μm at the most. The target of movement for the macro seek has been based on the linear scale with the result that the error between it and the target track is inevitably increased and the number of tracks to be passed by the micro seek is increased. In accordance with the present embodiment, by using the signals from the previously mentioned micro-pitch laser scale, highly accurate position information can be obtained and therefore the light spot position is considerably near to the target track at the end of the macro seek. Particularly, if the pitch of the scale is selected the same as the track pitch of the optical disc, the light spot position coincides with the target track at the end of the macro seek and practically there is no need for the micro seek of ④. Also, due to the fact that highly accurate position information can be obtained, by shifting the target of movement for the macro seek in accordance with the eccentricity of the optical disc, it is possible to eliminate the effect of the eccentricity.

Also, when performing the velocity control for the macro seek, highly accurate velocity information can be obtained over a range from high to low velocities. Velocity information can be obtained discretely each time the light spot passes through one of the grooves in the scale. For instance, if the cutoff frequency of the velocity control loop is set to 700 Hz and the allowable phase lag is set to 45 degrees, velocity information of as satisfactorily accurate as possible can be obtained down to about 9 mm/sec.

From the foregoing description it will be seen that in accordance with the present embodiment the seek time is the sum of the time required for the macro seek of ①, the time required for the track pull-in operation for the setting and the track following servo starting of ② and the time required for the address confirmation of ③. For instance, if it is assumed that the stroke is 70 mm and the acceleration of the macro moving mechanism is 25 G, the seek is completed in a total time of about 19 msec including about 18 msec for the macro seek of ① and about 1 msec for the setting and the track following servo starting of ② and the address confirmation of ③. In the second embodiment which will be described later, the optical head is divided into a movable head and a fixed optical system so that the weight of the moving part is reduced and a greater acceleration is ensured for the same thrust force of the macro moving mechanism. Also, by seeking the disc surface with a large number of light spots, it is possible to decrease the stroke required for the seek. For instance, assuming that one half of all the tracks is to be seeked and that the stroke is 35 mm and the acceleration of the macro moving mechanism is 50 G, the seek is completed in a total time of about 10 msec including about 9 msec for the macro seek of ① and about 1 msec for the setting and the track following servo starting of ② and the micro seek of ③, thus realizing the seek of a higher speed than in the magnetic disc memory apparatus.

The total system for performing the seek operation will now be described. Referring to FIG. 16, there is illustrated a block diagram showing the overall construction of a seek control circuit according to a first embodiment of the present invention. A linear motor 20 for moving an optical head 100 on the whole is used as a macro moving mechanism covering the whole disc radial surface, and a light deflector 104 including a non-mechanical optical deflecting element such as an A/O deflecting element or SAW element shown in FIG. 1 or FIGS. 2 and 4, is used as a micro moving mechanism for high-response micro positioning which follows a very small range.

An optical disc 10 is rotated about its shaft by a spindle motor 75. The optical head 100 is moved on a base 15 in the radial direction of the optical disc 10 in response to the turning of rollers 116. The optical head 100 is moved and controlled by the linear motor 20. The signals from the various detectors within the optical head 100 are sent to a light spot control signal detection and information playback circuit 35 which in turn detects a track error signal (tracking signal) Tr' and a data signal by the previously mentioned method. The data signal is used for the playback of data information and it is sent to a servo control circuit 30 to demodulate the data information (including the header information) recorded on the optical disc 10. It is to be noted that while the optical head 100 includes the defocusing detecting optical system and detects a focusing error signal as mentioned previously, this has no direct bearing on the seek operation and will not be described.

The track error signal Tr' is applied to a tracking control circuit 45 which in turn generates a micro following control signal R and a macro following control signal G. At this time, the servo control circuit 30 changes a micro moving mechanism drive mode switch circuit 55 and a macro moving mechanism drive mode switch circuit 60 to a track following mode so that the micro following control signal R drives the light deflector 104 within the optical head 100 through a micro moving mechanism drive circuit 65 and the projection position of a light spot is controlled to cause the light spot to follow the center line of the track. On the other hand, the macro following control signal G drives the linear motor 20 through a macro moving mechanism drive circuit 70 so that the optical head 100 is moved in the radial direction of the optical disc 10, and the light deflector 104 serving as the micro moving mechanism and the linear motor 20 serving as the macro moving mechanism cooperate to perform a track following operation. This is the so-called two-stage tracking servo system and the system is disclosed in JP-A-58-91536 and U.S. Pat. No. 4,607,358. It is to be noted that while the macro following control signal G can be obtained by electrically simulating the micro following control signal R as disclosed in JP-A-58-91536 and U.S. Pat. No. 4,607,358, the micro following control signal R can be used, as such, as the micro following control signal G in cases where the micro moving mechanism includes the A/O deflecting element as in the case of the present embodiment.

In this following condition, information OA indicative of an address to be accessed is sent from a higher level control unit which is not shown to the servo control circuit 30, thereby initiating an access operation (seek operation). When this occurs, the servo control circuit 30 reads the address of a currently accesed track from a reflected light quantity signal so that a macro seek movement N is computed and sent to a macro seek control circuit 50. Simultaneously, the servo control circuit 30 changes the micro moving mechanism drive mode switch 55 to a lock mode to place the control signal R to the micro moving mechanism drive circuit 65 in a hold condition. Where the micro moving mechanism employs a light deflecting element, the micro moving mechanism drive circuit 65 comprises a voltage controlled oscillator and the control signal R is placed in the hold condition, thus holding the driving frequency f of the light deflecting element 104 and thereby locking the light deflecting angle of the light deflecting element 104. On the other hand, the macro moving mechanism drive mode switch 60 is changed to a macro seek mode so that the output H of the macro seek control circuit 50 drives the linear motor 20 through the macro moving mechanism drive mode switch circuit 60 and the macro moving mechanism drive circuit 70 and the optical head 100 is moved rapidly in the radial direction of the optical disc 10. A moved position signal K of the optical head 100 is detected by the previously mentioned micro-pitch laser scale 200 and fed back to the macro seek control circuit 50, thereby applying a suitable control signal according to the position of the optical head 100 to the macro moving mechanism drive circuit 70. This suitable control signal is the desired velocity shown in FIG. 14B. This control signal controls in a manner that when the light spot is brought onto the target track for movement, the relative velocity of the light spot and the track is decelerated to one that allows the micro moving mechanism to pull-in the track.

When the light spot is brought onto the target track thus completing the macro seek, the macro seek control circuit 50 sends a signal A indicative of the end of the macro seek to the servo control circuit 30. The servo control circuit 30 releases the micro moving mechanism drive mode switch circuit 55 from the lock mode and changes the macro moving mechanism drive mode switch circuit 60 to the track following mode, thus pulling in the track and thereby performing again the previously mentioned two-stage tracking control. The servo control circuit 30 reads the current track address from the information signal from the optical disc 10 so that the error between it and the target address information or a micro seek movement J is computed and sent to the micro seek control circuit 40. In addition, the servo control circuit 30 changes the macro moving mechanism drive mode switch circuit 60 to the track following mode and applies a macro following control signal G to the macro moving mechanism drive circuit 70. The micro seek control circuit 40 switches the micro moving mechanism drive mode switch 55 between the track following mode and the micro seek mode. When the micro moving mechanism drive mode switch circuit 55 is in the micro seek mode, the micro seek control circuit 40 generates a track jump signal D so that the light deflector 104 is driven through the micro moving mechanism drive circuit 65 and the light spot is positioned at the target track. While the track jump operation is completed at a time when the error between the track pulled-in at the end of the macro seek and the target track is within a range that can be covered by the micro moving mechanism, if the target track cannot be reached by a single track jump, the micro moving mechanism drive mode switch circuit 55 is repeatedly switched between the track following mode and the micro seek mode, thereby repeating the track jump operation and the track following operation several times.

Figure 17:
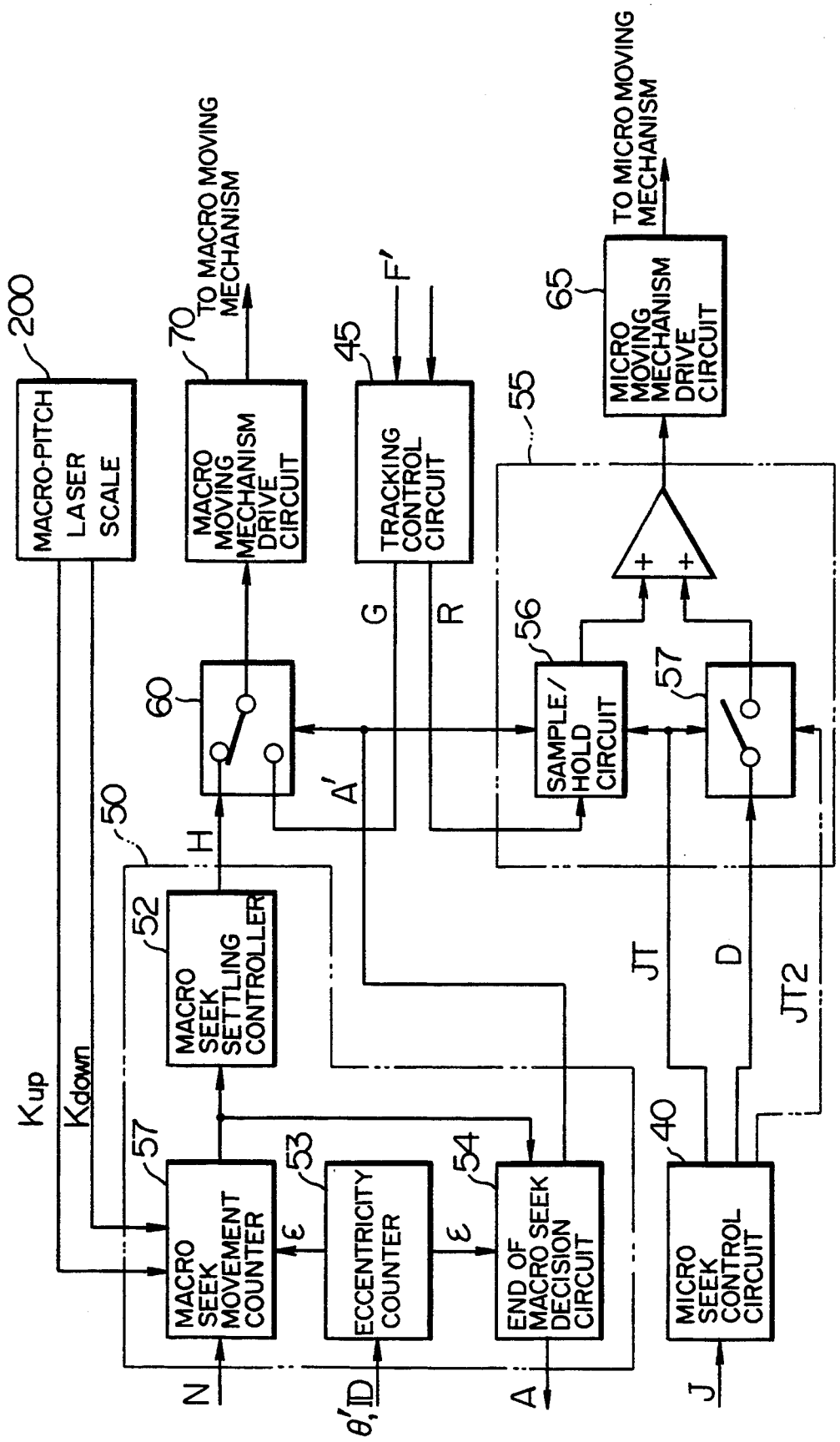
FIG. 17 is a block diagram for explaining the details and operation of the seek control circuit.

The operation of the macro seek control circuit 50 of FIG. 16 will now be described in detail with reference to the block diagram of FIG. 17. A value N representing the number of tracks to be jumped in terms of the scale pitch of the micro-pitch laser scale 200, is written into a macro seek movement counter 51. Particularly, where the track pitch is the same with the scale pitch, the macro seek movement N is equal to the number of tracks to be jumped.

For instance, where the number of tracks M to be passed is 10001, the track pitch p is 1.6 $\mu$m and the scale pitch L is 2.0 $\mu$m, we obtain $$\frac{Mxp}{L} = \frac{10001 \times 1.6}{2.0} = 8000.8$$

then by rounding it off into an integer, we obtain

N=8001

This is written into the macro seek movement counter 51. The resulting round-off error is 0.2. There is no danger of the amount of round-off error exceeding the scale pitch at the worst.

The macro seek movement counter 51 counts up or counts down in response to an up pulse signal Kup or down pulse signal Kdown generated in dependence on the direction of movement at intervals of the scale pitch of the macro-pitch laser scale 200.

In accordance with the value of the macro seek movement counter 51 or the macro seek deviation, a macro seek-setting controller 52 drives the macro moving mechanism drive circuit 70 or the driver for the linear motor 20 through the macro moving mechanism drive mode switch circuit 60. At this time, the output of the macro moving mechanism drive mode switch 60 is connected to its macro movement position H by a macro seek-track following change-over signal A'. Note that the macro seek-setting controller 52 includes a velocity detecting circuit, a desired velocity control curve generating circuit, a D/A converter and a differential amplifier. In other words, the macro seek deviation from the macro seek movement counter 51 is applied to the desired velocity control curve generating circuit so that the optimum desired velocity signal is generated. This desired velocity curve is such as shown by the dotted line in FIG. 14B so that during deceleration it is proportional to a square root of the macro seek deviation. In this case, the output of the macro seek movement counter 51 is generated digitally so that a table of square roots is preliminarily stored in an ROM and the corresponding desired velocity signal is digitally generated in accordance with the macro seek deviation from the target position. The desired velocity signal is applied to the D/A converter so that the signal is converted to an analog value and applied to one input of the differential amplifier. The velocity signal from the velocity detecting circuit is applied to the other input of the differential amplifier thereby producing the difference. The difference output represents the difference between the desired velocity and the actual velocity. This is the output H of the macro seek control circuit 50.

Also, during the macro seek starting period, the micro moving mechanism drive mode switch circuit 55 is changed to the lock mode and a sample/hold circuit 56 is placed in a holding condition. The micro moving mechanism drive circuit 65 includes a voltage controlled oscillator and it holds the control signal, thus holding the driving frequency of the light deflector and thereby locking the deflection angle of the light by the light deflector.

Where the micro moving mechanism comprises a mechanical actuator such as a galvano-mirror as in the conventional apparatus, if the actuator is not locked during the macro seek movement, the actuator is caused to vibrate by the acceleration during the movement thus increasing the setting time considerably. In order to effect the locking, it has been necessary to provide a torsional angle sensor or the like as a position detector for the micro moving mechanism and provide a feedback loop by utilizing the detector output signal. However, where the non-mechanical light deflecting element 104 is used for the micro moving mechanism as in the present embodiment, the locking can be effected by simply holding the driving frequency and therefore there is no need to provide such position detector and feedback loop. Also, where the light deflecting element is used, there is no need to effect the locking from the vibration standpoint of the micro moving mechanism. However, the macro seek movement counter 51 operates on the basis of the position of the micro moving mechanism just before the seek so that if this position is shifted, it results in a macro seek error. As a result, the micro moving mechanism is locked in the condition just before the macro seek movement.

In addition, as shown in FIG. 15, during the macro seek the light spot can be advanced in the seek direction by the micro moving mechanism over the optical head. This is effective in cases where the range covered by the micro moving mechanism is small. Also, in this case, the macro seek movement counter 51 must be corrected by the amount corresponding to the advancement of the micro moving mechanism.

When the light spot is brought onto the target track so that the value of the macro seek movement counter 51 is reduced to zero and the setting operation is brought to an end, in accordance with a macro seek-track following switching signal A' or the output of an end of macro seek decision circuit 54, the macro moving mechanism drive mode switch circuit 60 is switched and also the sample/hold circuit 56 of the micro moving mechanism drive mode switch circuit 55 is placed in the sampling condition. When this occurs, the macro following control signal G and the micro following control signal R from the tracking control circuit 45 are respectively applied to the macro moving mechanism drive circuit 70 and the micro moving mechanism drive circuit 65, thereby starting the track pull-in operation.

When the track is pulled-in and the track following operation is started, the track address is read by the information read circuit within the servo control circuit 30 and the deviation amount J from the target track is computed. If the pulled-in track is the target track, the access operation (seek operation) is completed entirely. If it is not the target track, a track jump signal D is generated so that the light deflector 104 moves the light spot by an amount corresponding to the deviation J. Also, the sample/hold circuit 56 is changed to the hold mode by a track jump select signal JT and a switch 57 is turned on, thereby driving the micro moving mechanism drive circuit 65. The light deflector 104 operates at a high speed as compared with the conventional mechanical micro moving mechanism and the track jump operation is completed instantaneously. After the completion of the track jump, the track jump select signal JT switches the sample/hold circuit 56 to the sample mode and the switch 57 is turned off, thereby starting the track following control. When the address of the track is confirmed so that it is the target track, the track jump is completed. If it is not, the track jump is repeated until the light spot is moved to the target track. Particularly, where the micro-pitch laser scale of substantially the same pitch as the track pitch of the optical disc is used for detecting the amount of movement of the optical head, practially there is no error between the pulled-in track after the macro seek movement and the target track and the amount of movement of the light spot by the micro seek is reduced. While, in the present embodiment, both the sample/hold circuit 56 and the switch 57 are controlled by the track jump select signal JT, if the track jump signal D is turned off upon changing the sample/hold circuit 56 to the sample mode, due to the high speed operation of the micro moving mechanism, there is the danger of the light spot being returned before the track following control system starts operating. In such a case, the track jump select signal JT is divided into a select signal for the sample/hold circuit 56 and a select signal for the switch 57 thus separately controlling them. In other words, the sample/hold circuit 56 is changed to the hold mode by a track jump select signal JT and simultaneously the switch 57 is turned on by a track jump select signal $JT_2$, initiating the track jump operation. After the completion of the track jump operation, the sample/hold circuit 56 is changed to the sample mode by the track jump select signal JT and the track following operation is started. Thereafter, the track jump signal D is again returned to zero and this return to zero is effected at such speed that the macro moving mechanism can follow it. When the track jump signal D is again returned to zero, the switch 57 is turned off by the track jump select signal $JT_2$.

Also, in the present embodiment the eccentricity of the optical disc is added to the macro seek movement counter 51 to provide an eccentricity correction. In other words, as shown in FIG. 17, an eccentricity counter 53 is provided to detect the eccentricity $\epsilon$ of the optical disc and the macro seek movement counter 51 is corrected by the value of the counter 53. As shown in FIG. 16, the optical disc 10 is rotated with a slight eccentricity by the spindle motor 75 so that a rotational angle detector 80 generates rotational angle information $\theta'$ of the optical disc 10 and a single reference angle index signal ID for every disc rotation. The eccentricity counter 53 is reset by the reference angle index signal ID for every disc rotation. The disc eccentricity $\epsilon$ or the output of the eccentricity counter 53 and the angular information $\theta'$ from the rotational angle detector 80 are measured over a plurality of optical disc rotations during the initial starting period of the optical disc 10 and the average relation between the eccentricity and the rotational angle is stored as follows $$\epsilon = f(\theta')$$

It is to be noted that when describing the eccentricity $\epsilon$, use is made of the up and down pulse signals Kup and Kdown generated from the micro-pitch laser scale 200 when the micro moving mechanism (light deflector) is changed to the lock mode thereby performing the track following operation.

The macro seek movement counter 51 is always corrected by the signal $\epsilon$ from the eccentricity counter 53 so that when the macro seek is completed, the end of macro seek decision circuit 54 checks the macro seek deviation or the output of the macro seek movement counter 51 to determine the completion of the setting.

The above-described eccentricity correction is described in detail in U.S. Ser. No. 240,487 proposed formerly by the inventors.

The tracking control system shown in FIGS. 16 and 17 will now be described.

Figure 18A:
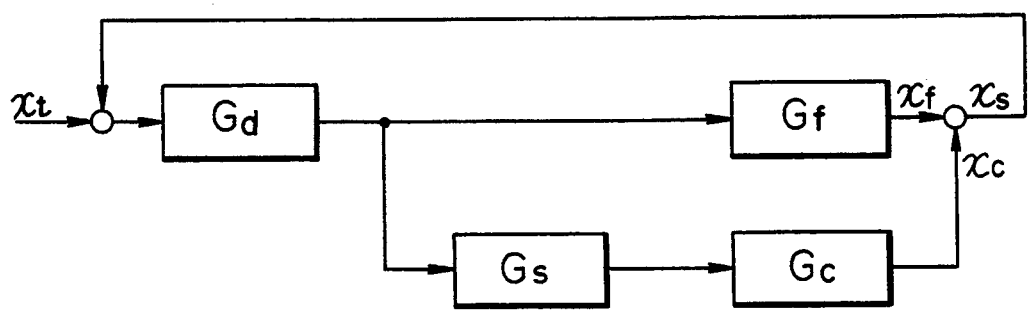
FIGS. 18A and 18B are block diagrams showing examples of the construction of a tracking servo control system.

Basically, the tracking control system employs the two-stage tracking servo disclosed in JP-A-58-91536 and U.S. Pat. No 4,607,358. In other words, the optical disc memory apparatus employs the two-stage tracking servo constructed as shown in FIG. 18A. In the Figure, symbol $G_d$ indicates a characteristic of a track error signal detecting system, $G_f$ a characteristic of the micro moving mechanism including the drive circuit, and $G_c$ characteristic of the macro moving mechanism including the drive circuit. Symbol $X_c$ indicates the position of the macro moving mechanism, and $X_f$ the displacement of the light spot by the micro moving mechanism, with the sum $X_s$ of $X_c$ and $X_f$ indicating the position of the light spot. The difference between the position $X_s$ of the light spot and the position $X_t$ of the target track to be followed is detected by the track error signal detecting system described with reference to FIG. 7, 8, 10 or 11. The micro moving mechanism follows or responds to the track error signal. The track pitch of the optical disc is several $\mu$m at the most and the linear range of the track error signal is as small as less than one half the track pitch. Then, the resolution of the position of the macro moving mechanism is still lower than the linear range and thus it is impossible for the track error signal to follow the target. As a result, the movement of the micro moving mechanism is adopted as the target of the macro moving mechanism to follow. Designated as $G_s$ is a simulator for simulating the characteristic of the micro moving mechanism which provides an operation target of the macro moving mechanism.

Figure 18B:
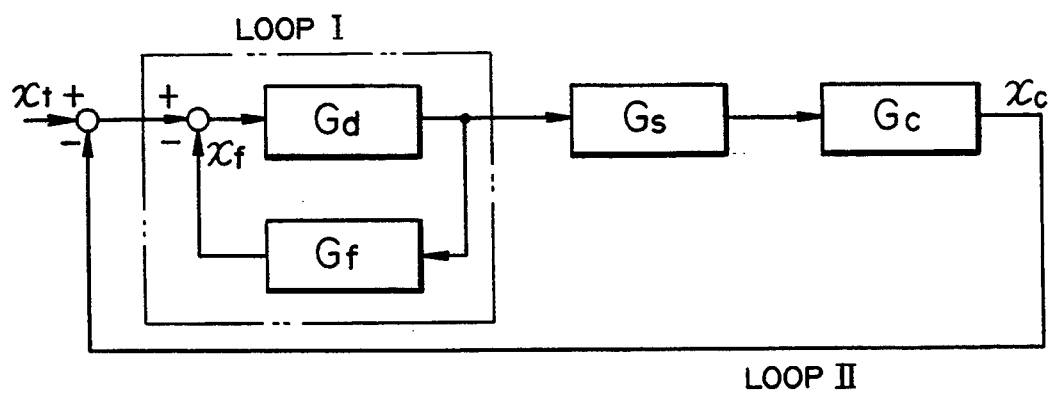

In the present embodiment, the micro moving mechanism includes a light deflector such as an A/O deflecting element or SAW element. Such light deflector has no mechanical moving part as mentioned previously and thus it operates rapidly. In other words, when judging from its characteristic, the gain remains constant up to high frequencies and there is no phase delay as shown in FIG. 4. FIG. 18B is a rewritten version of FIG. 18A. In the Figure, the portion enclosed by the broken line is designated as a loop I and the loop on its outer side is designated as a loop II. The loop I forms a feedback system for the micro moving mechanism and the loop II forms a feedback system for the macro moving mechanism.

Figure 19:
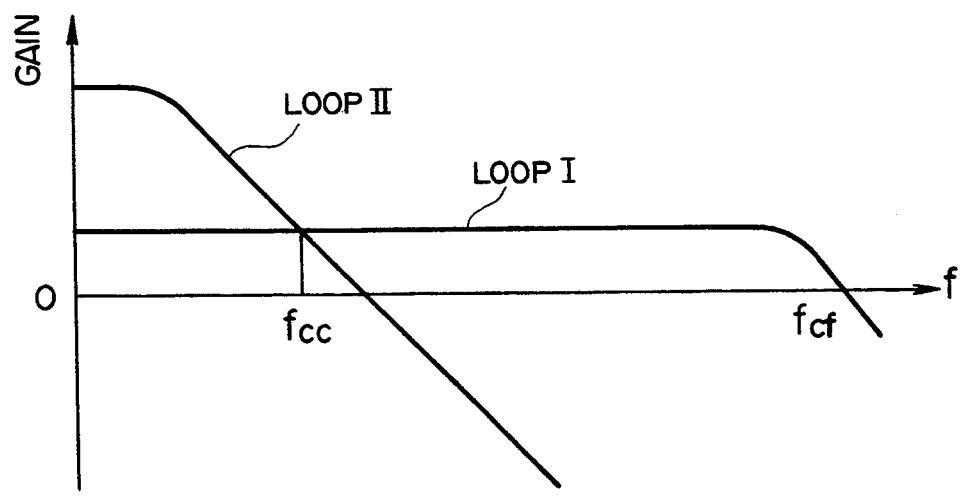
FIG. 19 is a diagram showing characteristics of the control loops of FIG. 18B.

FIG. 19 shows open-loop characteristics of the loops I and II. In the Figure, designated as fcf and fcc are the cutoff frquencies of the loop I and the whole system, respectively. The values of the cutoff frequencies fcf and fcc will be mentioned later.

Figure 20A:
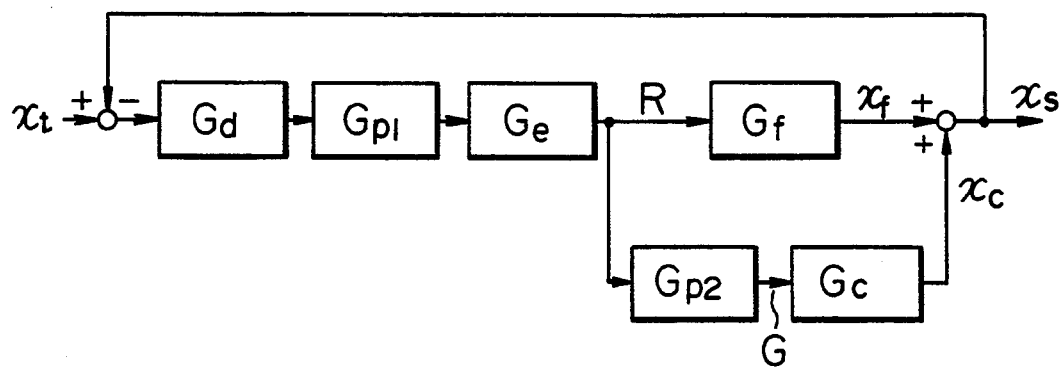
FIGS. 20A and 20B are diagrams showing another examples of the construction of the tracking servo control system.

Referring now to FIG. 20A, there is illustrated another example of the construction of the two-stage tracking servo used with the present invention. If the micro moving mechanism includes a light deflector such an A/O deflecting element or SAW element, while such light deflector has no mechanical part and is adapted to electrically vary the deflection angle thereby maintaining the gain constant up to high frequencies and involving no secondary resonance, some time is required for the propagation of ultrasonic wave through the deflector and there is the effect of the previously mentioned wobbling, thereby giving rise to the danger of causing the phase to delay at high frequencies. If feedback loops are formed in these conditions, there is the danger of phase interaction thus causing the servo system to become unstable. Thus, as shown in FIG. 20A, a low-pass filter $G_l$ is inserted to reduce the gain at high frequencies.

Figure 20B:
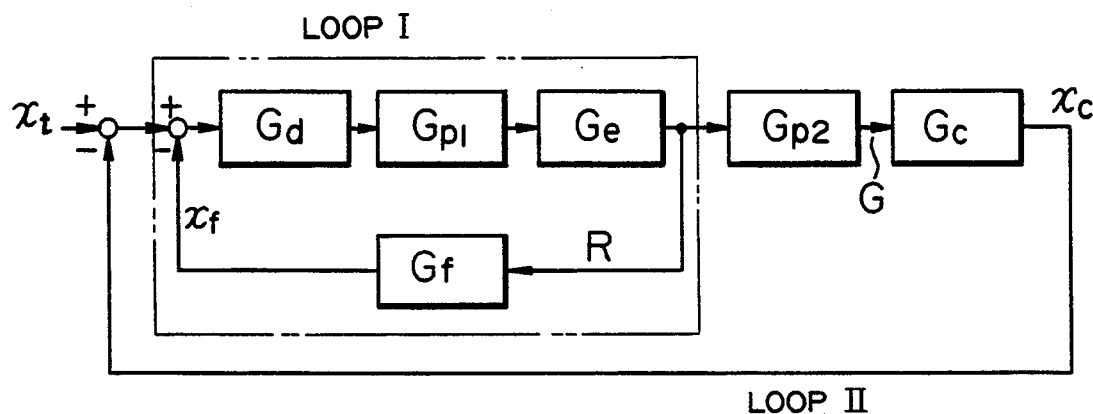

In the Figure, alike in FIG. 18A, symbol $G_d$ indicates a characteristic of the track error signal detecting system, $G_f$ a characteristic of the micro moving mechanism including the drive circuit, and $G_c$ a characteristic of the macro moving mechanism including the drive circuit. Symbol $G_{p1}$ a phase leading circuit for stabilizing the micro moving mechanism, and $G_{p2}$ phase advancing circuit for stabilizing the macro moving mechanism. Designated by $X_c$ is the position of the macro moving mechanism, and $X_f$ the displacement of the position of the light spot by the micro moving mechanism, with the sum $X_s$ of $X_c$ and $X_f$ indicating the position of the light spot. The difference between the position $X_s$ of the light spot and the position $X_t$ of the target track to be followed is detected by the track error signal detecting system described with reference to FIG. 7, 8, 10 or 11 in all the same way as in FIG. 18A. Also, while the movement of the micro moving mechanism is detected as the target of the micro moving mechanism to follow, if the micro moving mechanism includes a light deflecting element, the movement of the micro moving mechanism reflects faithfully the input to the $G_f$. As a result, it is only necessary to employ the input to the $G_f$ as the target for the operation of the macro moving mechanism and it is possible to eliminate the simulator $G_s$ for simulating the characteristic of the micro moving mechanism with the resulting simplification in the construction of the servo system. FIG. 20B is a rewritten version of FIG. 20A.

The characteristic G of the whole tracking control system according to the present embodiment can be given as follows $$G = G_d \cdot G_{p1} \cdot G_l(G_f + G_{p2} \cdot G_c)$$

Figure 21:
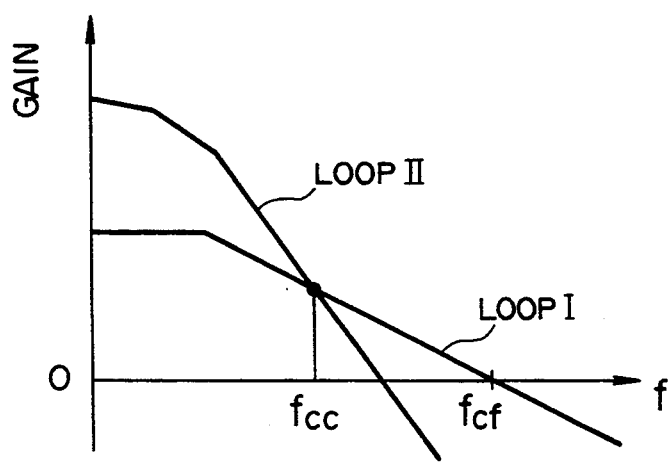
FIG. 21 is a diagram showing characteristics of the control loops of FIG. 20B.

FIG. 21 shows its Bode diagram. Assuming that fcc represents the frequency at which the loop I or the micro moving mechanism control loop $G_d \cdot G_{p1} \cdot G_l \cdot G_f$ and the loop II or the macro moving mechanism control loop $G_d \cdot G_{p1} \cdot G_l G_{p2} \cdot G_c$ cross each other, the micro and macro moving mechanism operate cooperatively in such a manner that the macro moving mechanism mainly functions at frequencies lower than fcc and the micro moving mechanism mainly functions at frequencies higher than fcc. With a view to stabilizing the micro moving mechanism, the phase leading circuit $G_{p1}$ leads the phase centering the zero-crossing frequency fcf at which the gain of the micro moving mechanism control loop is reduced to 0 dB. The phase leading circuit $G_{p2}$ leads the phase centering the cross frequency fcc for the purpose of stabilizing the macro moving mechanism.

While the charactersistic of the micro moving mechanism control loop I has heretofore been determined mainly by the characteristic of the mechanical actuator and showing the characteristic of the second-order spring-mass system, in the present embodiment it can be determined as desired by the low-pass filter $G_l$.

Where the low-pass filter $G_l$ is of the second order, it can be made to have the similar characteristic to that of the conventional mechanical actuator. However, since there is no secondary resonance which is the problem encountered with the mechanical actuator, the zero-crossing frequency or the bandwidth of the micro moving mechanism control loop can be increased. On the other hand, where the low-pass filter $G_l$ is of the first order, the phase delay in the vicinity of the zero-crossing frequency fcf is on the order of 90 degrees and therefore there is no need for the phase leading circuit $G_{p1}$ which stabilizes the micro moving mechanism.

Next, a description will be made of the band fcf of the micro moving mechanism control loop and the band fcc of the macro moving mechanism control loop.

Figure 23A:
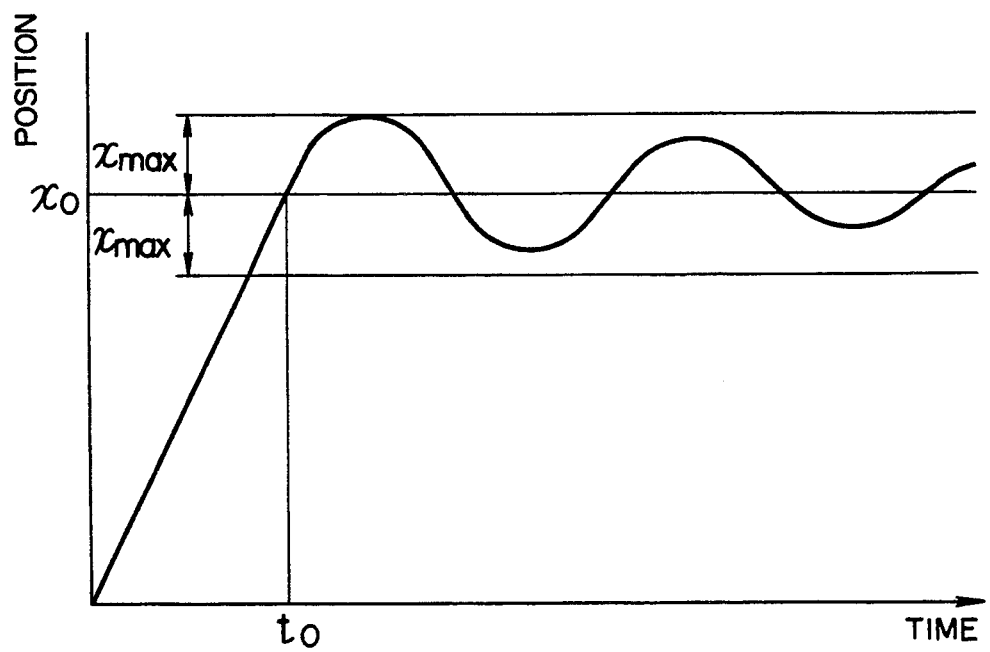
FIGS. 23A and 23B are graphs useful for explaining the linear position control system of FIG. 22.

Generally, the transient response characteristic of a feedback control system can be considered by approximating the system to a second-order system. Consider now the system of FIG. 22. Assume that an object having an initial velocity $V_0$ at a position $X_0$ is to be brought to rest at around the position $X_0$ as shown in FIG. 23A. The object oscillates on both sides of the position $X_0$ and then its amplitude is gradually reduced due to the effect of damping $\zeta$ of the system. If the maximum value of the amplitude from the position $X_0$ is represented as $X_{max}$ and the band of the control system is represented as fn, there is the following relation $$X_{max} \cdot 2\pi fn \geq f(\zeta) \cdot V_0$$

where $$f(\zeta) = \frac{e^{-\frac{\pi}{2} \cdot \frac{\zeta}{\sqrt{1-\zeta^2}}}}{\sqrt{1-\zeta^2}}$$

Figure 23B:
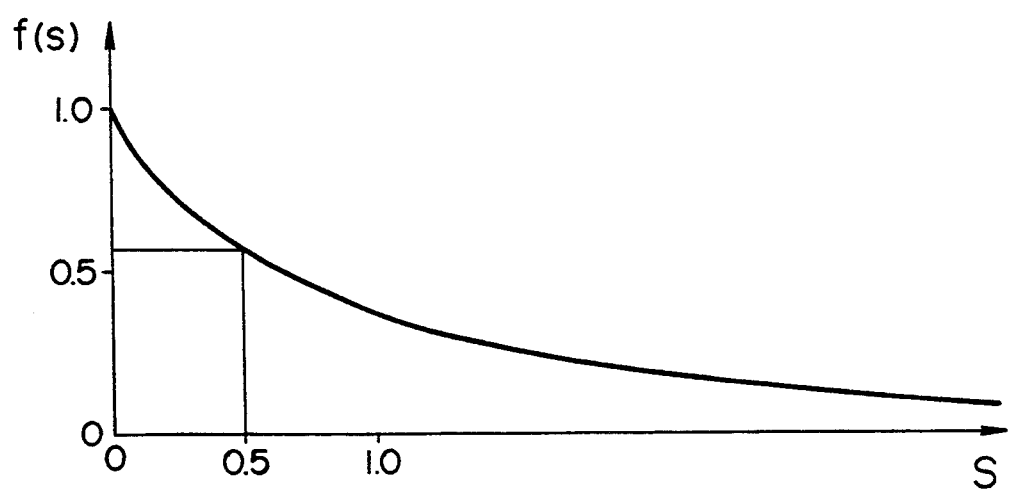

An example is shown in FIG. 23B.

Consider a case where a track is pulled-in by a two-stage tracking servo system. If the track pitch is p=1.6 μm, the resulting detection range of a tracking signal is ±0.4 μm. When accessing the track, if $X_{max}$=0.4 μm, $V_0$=55 mm/sec (the relative velocity between the light spot and the track at the end of the macro seek is $V_l$), $\zeta$=0.4 and f($\zeta$)=0.55, then the band fcf of the micro moving mechanism control loop I is given as follows $$fcf \geq \frac{f(\zeta) \cdot V_0}{2\pi X_{max}}$$

$$\approx 12 \text{ KHz}$$

In other words, the control loop of a light deflecting element must have a band of higher than about 12 KHz. Such a high band can be realized only by use of a light deflecting element having no mechanical moving part.

Also, even if the pull-in range of 0.4 μm is expanded by use of a cross-track count signal, there is the disadvantage of increasing the time required for the completion of the pull-in and the band of the micro moving mechanism must be increased inevitably. For instance, assuming that $V_0$=100 mm/sec and $\zeta$=0.5 and that the pull-in is completed when the deviation from the target track is less than 0.03 μm, the band of the micro moving mechanism control loop must be higher than about 20 KHz when the time required for the pull-in is 60 μsec and about 12 KHz when the pull-in time is 100 μsec.

While it is desirable that all the tracks are covered by the light deflecting element, the possible deflection angle of light by an A/O deflecting element, for example, is actually the order of ±3 m rad so that where a converging lens having a focal distance of 5 mm is used, the amount of movement of the light spot on the optical disc is ±15 μm. Therefore, it is only necessary for the macro moving mechanism to bring the optical head within a range of 30 μm. If $X_{max}$=15 μm, $V_0$=55 mm/sec, $\zeta$=0.4 and f($\zeta$)=0.55, the band fcc of the macro moving mechanism control loop is given as follows $$fcc \geq \frac{f(\zeta) \cdot V_0}{2\pi X_{max}}$$

$$\approx 320 \text{ Hz}$$

In other words, it is only necessary for the control loop to have a band higher than about 320 Hz.

From the foregoing description it will be seen that in order that the track may be pulled-in with the relative velocity between the track and the light spot being high, the band of the micro moving mechanism control loop must be increased. While it is also dependent on the relative velocity between the track and the light spot or the magnitude of the velocity error at the end of the macro seek, the band of the micro moving mechanism control loop is selected higher than 10 KHz during the period of track pull-in operation. Also, during the track following period after the completion of the track pull-in operation, there is the danger of causing an inconvenience if the band of the micro moving mechanism control loop is left to remain high. In other words, the following performance is so good up to high frequencies that the control loop also responds to a signal caused by a deflect in the track of the disc, tiny dust; noise or the like and thus there is the danger of the light spot being caused to oscillate excessively. In such a case, during the period of track following, the band of the micro moving mechanism control loop is switched to a low level. In order to switch the band of the micro moving mechanism control loop, in FIG. 18B, for example, the gain of the track error signal detecting system $G_d$ can be changed to effect the switching. During the track following period, generally the band of the micro moving mechanism control loop should preferably be selected lower than 5 KHz.

Also, where the low-pass filter $G_l$ is of the second order in the servo control system such as shown in FIG. 20A, the gain of $G_d$, $G_{p1}$ or $G_l$ is switched. In this case, while, in FIG. 21, the cross frequency fcc or the band of the macro moving mechanism control loop does not change, the zero-crossing frequency fcf or the band of the micro moving mechanism control loop is changed. As a result, the center frequency for the phase advance of the phase leading circuit $G_{p1}$ must also be changed. If the gain of $G_f$ is changed, both the zero-crossing frequency fcf and the cross frequency fcc are changed and therefore the center frequency for the phase lead of the phase leading circuit $G_{p2}$ must also be changed. Therefore, it is preferable to change the gain of any of $G_d$, $G_{p1}$ and $G_l$.

Referring now to FIG. 24, there is illustrated an example of a construction for such band switching. An end of track access decision circuit 90 examines the end of macro seek signal A from the end of macro seek decision circuit 54 shown in FIG. 17 to determine that the track pull-in operation has been initiated so that the gain of the low-pass filter $G_l$ is increased by a band select signal B and the band is increased to higher than 10 KHz. At this time, the zero-crossing frequency fcf is changed so that simultaneously the center frequency for the phase lead of the phase leading circuit $G_{p1}$ is also changed by the band select signal B.

The track pull-in operation is terminated when the positioning accuracy of the light spot is less than a certain tolerance, e.g., 0.03 μm. Then, the end of track pull-in decision circuit 90 determines the end of the track pull-in when the track error signal is less than a value equivalent to 0.03 μm and the signal lasts for a given time. When this occurs, the gain of the low-pass filter $G_l$ and the center frequency for the phase advance of the phase advancing circuit $G_{p1}$ are again changed by the band select signal B, thus reducing the band to less than 5 KHz.

While the gain of the low-pass filter $G_l$ is changed in the above-described case, the gain of $G_d$ or $G_{p1}$ may be changed.

Where the low-pass filter $G_l$ is of the first order, the phase leading circuit $G_{p1}$ is not required as mentioned previously. Thus, in order to change the band, it is only necessary to change the gain of $G_d$ or $G_l$.

Figure 25:
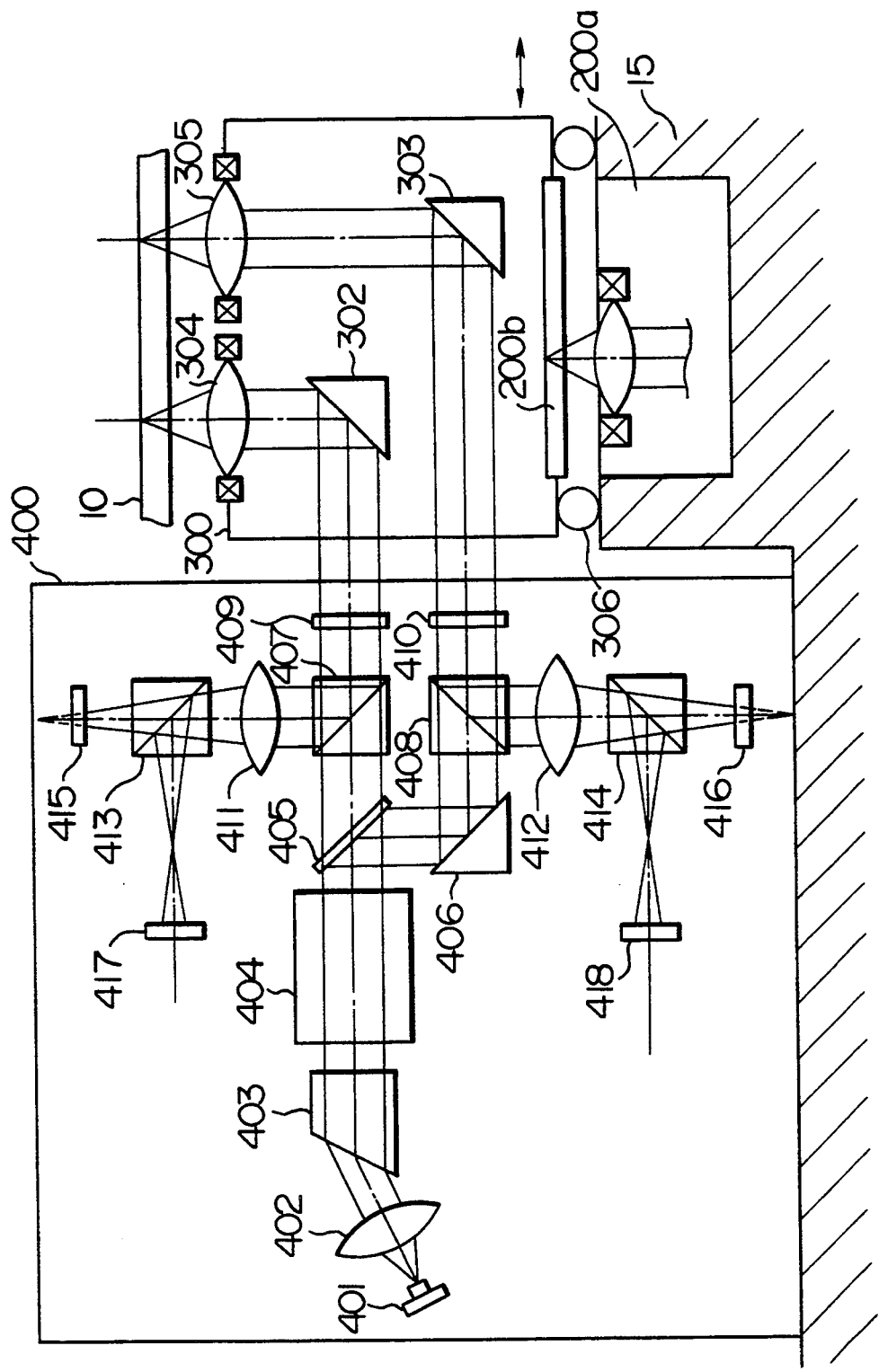
FIG. 25 is a schematic diagram showing another embodiment of the optical head used with the invention.

Referring now to FIG. 25, there is illustrated another embodiment of the optical head used with the present invention. While, in the previously described embodiment, the whole optical system is incorporated in the movable optical head 100, in the present embodiment the optical head includes a fixed optical system 400 fixedly mounted on a base 15 and a movable optical system 300 driven by the macro moving mechanism.

A laser diode 401 is of the type which generates two laser beams of different wavelengths. The light beam emitted from the laser diode 401 is converted into a collimated beam by a collimating lens 402, reshaped to a circular beam by a beam shaping prism 403 and then directed to a light deflector 404 serving as a micro moving mechanism. The light deflector 404 includes a non-mechanical light deflecting element, e.g., an A/O deflecting element or SAW element as mentioned previously and beam shapers. The light beam having its emission angle changed by the light deflector 404 is divided into two light beams by a wavelength separating filter 405. The light beam reflected by the wavelength separating filter 405 is changed in optical path to become substantially parallel to the light beam passed through the wavelength separating filter 405 and the two light beams become nearly parallel to each other. The two light beams then enter onto polarizing prisms 407 and 408, respectively. At this time, if the polarizations of the light beams are selected such that they take the form of P polarized lights to the polarizing prisms 407 and 408, respectively, the large parts of the light beams are passed straight through the polarizing prisms 407 and 408. The light beams emerging from the polarizing prisms 407 and 408 are respectively formed into circularly polarized light beams through λ/4 plates 409 and 410 and are emitted from the fixed optical system 400. The light beams emitted from the fixed optical system 400 are introduced into the movable optical system 300 which is driven by the macro moving mechanism. In the movable optical system 300, the light beams are respectively reflected by reflecting mirrors 302 and 303 and are respectively passed through converging lenses 304 and 305, thereby forming light spots on the optical disc 10. These light spots can be moved in the tracking direction (the direction traversing the tracks) by the previously mentioned light deflector 404. The light beams reflected from the optical disc 10 are again passed through the converging lenses 304 and 305 and the reflecting mirrors 302 and 303, emitted from the movable optical system 300, returned to the fixed optical system 400 and restored to linearly polarized light beams through the λ/4 plates 409 and 410. At this time, the polarizations take the form of S polarized lights relative to the polarizing prisms 407 and 408 so that the polarized light beams are not passed through but reflected by the polarizing prisms 407 and 408. The reflected light beams are respectively passed through convex lenses 411 and 412 and are then respectively converged onto front-to-back differential type detectors 415 and 416 or 417 and 418 by half prisms 413 and 414.

As in the previously described embodiment, the amount and rate of movement of the optical head 300 (the movable optical system) are detected by a micropitch laser scale 200 attached to the base 15 and the movable optical system 300.

It is to be noted that the focus control-type starting method employing two light spots is disclosed in U.S. Ser. No. 316,786 previously proposed by the inventors.

Figure 26A:
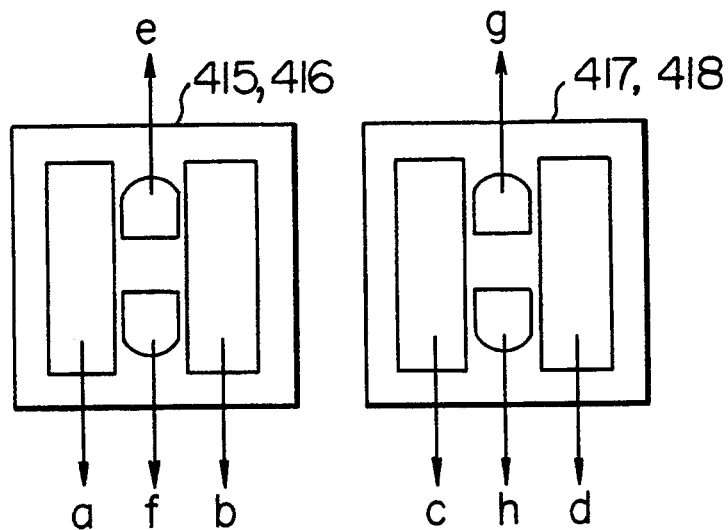
FIGS. 26A and 26B are diagrams showing respectively the detectors and their signal detection systems.
Figure 26B:
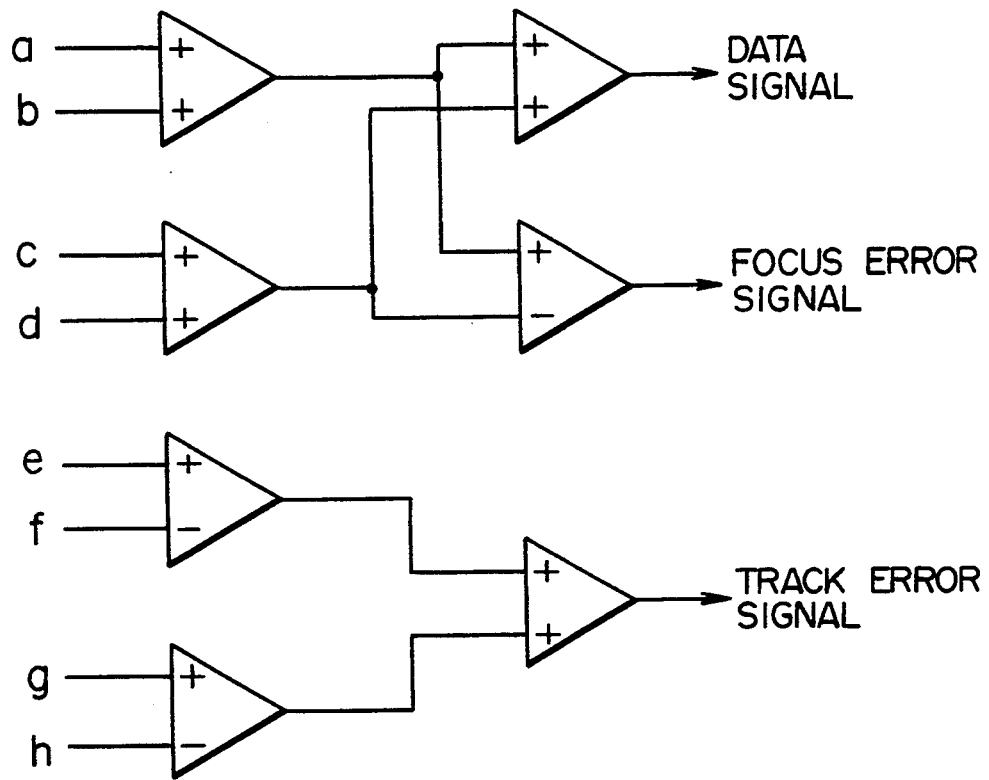

FIG. 26A shows the shapes of the detectors 415, 416 and 416, 418, respectively. They are so constructed that the detectors for focus error signal and track error signal detecting purposes used in the previously mentioned embodiment (see FIGS. 5 and 6) are mounted on the same substrate. While, in the front-to-back differential type, the occurrence of a focus error results in a change in the size of the light spot image on the detector, its signal systems are constructed as shown in FIG. 26B so as to prevent any interference of the focus error with a track error signal. It is to be noted that the method of correcting the offset in the track error signal is the same as in the embodiment described with reference to FIG. 7, 8, 10 or 11.

In accordance with the present invention, the macro seek accounts for the greater part of the seek time as described with reference to FIG. 14A. To realize a high speed seek requires that the time required for a macro seek is reduced. For this purpose, there are two methods one of which is to reduce the stroke of the seek and the other is to increase the acceleration on the head.

Where a plurality of light spots are used to seek the whole disc surface, the number of tracks to be covered by each spot is decreased. Thus, the stroke of the optical head is reduced and the time required for the macro seek is reduced further. For instance, where two spots are used, selecting the interval between the two spots one half the disc radius to be seeked reduces the average amount of movement of the head to one half. By so doing, the time required for the macro seek becomes $1/\sqrt{2}$.

In accordance with the present embodiment, the optical head is divided into the fixed optical system 400 and the movable optical system 300 and this has the effect of reducing the component parts of the movable head 300. As a result, the movable head 300 is reduced in size and weight and the burden on the macro moving mechanism is reduced, thereby driving the movable head at a greater acceleration. In addition, the rigidity of the movable head 300 can be increased correspondingly to the reduction in size and weight and the secondary resonance of the head exerting an ill effect on the servo system can be reduced. Also, while the distance between the light deflector 404 and the converging lenses 304 and 305, respectively, is increased thus tending to cause a track offset, the method of offset cancellation by wobbling and the method of track error signal detection from the total reflected light quantity, as mentioned previously with reference to FIG. 8, 10 or 11, are also effective in the case of the present embodiment.

The seek method of this embodiment is the same as explained with reference to FIGS. 16 and 17 and will not be described.

From the foregoing description it will be seen that in accordance with the present invention the seek time required in an optical disc memory apparatus can be reduced to about the same or smaller than that in the magnetic disc memory apparatus.

What is claimed is:

1. A light spot positioning method, comprising the steps of performing a seek operation of positioning a record/playback light spot at a desired track on a recording medium by a macro moving mechanism for an optical head and a micro moving mechanism comprising a non-mechanical optical deflector mounted on one of said optical head and a base of a record/playback apparatus, and changing a bandwidth of a control servo of said micro moving mechanism from a higher value during a track pull-in operation period to a lower value during a track following operation period, and effecting wobbling of said light spot projected on the recording medium by said micro moving mechanism wherein when performing the macro seek in said seek operation, during deceleration of said light spot, deceleration is effected at a uniform acceleration until said desired track is reached and a following target of said macro moving mechanism is decelerated at an acceleration of at least 15 G, where G is a unit acceleration.

2. A light spot positioning method according to claim 1, wherein the bandwidth of the control servo of said micro moving mechanism is selected to be at least 10 KHz during said track pull-in operation.

3. A light spot positioning method according to claim 2, wherein the bandwidth of the control servo of said micro moving mechanism is selected to be greater than 10 KHz during the track pull-in operation.

4. A light spot positioning method according to claim 1, wherein the bandwidth of the control servo of said micro moving mechanism is selected to be no greater than 5 KHz during said track following operation.

5. A light spot positioning method according to claim 1, wherein when changing the bandwidth of the control servo of said micro moving mechanism, a bandwidth of a control servo of said macro moving mechanism is maintained constant.

6. A light spot positioning method according to claim 1, wherein said micro moving mechanism comprises a mechanism having a flat amplitude characteristic within the bandwidth of the control servo thereof.

7. A light spot positioning method according to claim 6, wherein the gain of the control servo of said micro moving mechanism is reduced in a high frequency range by a low-pass filter.

8. A light spot positioning method according to claim 7, wherein said low-pass filter is a low-pass filter of first order.

9. A light spot positioning method according to claim 8, wherein the bandwidth of the control servo of said micro moving mechanism is changed by changing the gain thereof.

10. A light spot positioning method according to claim 7, wherein said low-pass filter is a low-pass filter of second order.

11. A light spot positioning method according to claim 10, wherein the bandwidth of the control servo of said micro moving mechanism is changed by changing the gain thereof and changing a center frequency of a phase leading circuit in said micro moving mechanism.

12. A light spot positioning method according to claim 6, wherein a following target of said macro moving mechanism is the same as a control input to said micro moving mechanism during said track following operation.

13. A light spot positioning method as claimed in claim 1 comprising the further step of detecting the position of said optical head by an external linear scale, wherein said external linear scale comprises a linear scale having a resolution of substantially the same as a track pitch of said optical disc.

14. A light spot positioning method according to claim 13, wherein the resolution of said linear scale is the same as the track pitch of said optical disc.

15. A light spot positioning method according to claim 13, wherein a seek operation of positioning a record/playback light spot at a desired track of said optical disc is performed by counting signals from said linear scale.

16. A light spot positioning method according to claim 1, wherein the wobbling of said light spot is effected in a manner that said light spot is wobbled from an initial position thereof to each side of a radial direction of said track by ½ of a track pitch.

17. A light spot positioning method according to claim 1, wherein a wobbling period Tw for the wobbling of said light spot is selected to be 10 μs or less.

18. A light spot positioning method according to claim 1, wherein an interval Ti of a wobbling period of said light spot is variable.

19. A light spot positioning method comprising the steps of performing a seek operation of positioning a record/playback light spot at a desired track on a recording medium by a macro moving mechanism for an optical head and a micro moving mechanism comprising a non-mechanical optical deflector mounted on one of said optical head and a base of a record/playback apparatus, and wobbling the light spot projected from said optical head from an initial position thereof to each side of said track by said micro moving mechanism to detect a track error signal from a difference between resulting reflected light quantities, wherein an interval Ti of a wobbling period of said light spot is selected to be $Ti < 1/(3-2\pi fcf)$ with respect to a bandwidth fcf of a control servo of said micro moving mechanism.

20. A light spot positioning method according to claim 19, wherein the bandwidth of the control servo of said micro moving mechanism is selected to be greater than 10 KHz during the track pull-in operation.

21. A light spot positioning method comprising the steps of performing a seek operation of positioning a record/playback light spot at a desired track on a recording medium by a macro moving mechanism for an optical head and a micro moving mechanism comprising a non-mechanical optical deflector mounted on one of said optical head and a base of a record/playback apparatus, and wobbling the light spot projected from said optical head from an initial position thereof to each side of said track by said micro moving mechanism to detect a track error signal from a difference between resulting reflected light quantities, wherein an interval Ti of a wobbling period of said light spot is selected to be longer during a track following operation than during a track pull-in operation.

22. An optical disc memory apparatus according to claim 21, wherein the bandwidth of the control servo of said micro moving mechanism is selected to be greater than 10 KHz during said track pull-in operation.

23. A method as claimed in claim 21, wherein the wobbling of said light spot is effected in a manner that said light spot is wobbled from an initial position thereof to each side of a radial direction of said track by ½ of a track pitch.

24. A method as claimed in claim 21, wherein a wobbling period Tw for the wobbling of said light spot is selected to be 10 μs or less.

25. A method as claimed in claim 21, wherein an interval Ti of a wobbling period of said light spot is variable.

26. A light spot positioning method comprising the steps of performing a seek operation of positioning a record/playback light spot at a desired track on a recording medium by a macro moving mechanism for an optical head and a micro moving mechanism comprising a non-mechanical optical deflector mounted on one of said optical head and a base of a record/playback apparatus, and wobbling the light spot projected from said optical head from an initial position thereof to each side of said track by said micro moving mechanism to detect a track error signal from a difference between resulting reflected light quantities, wherein an interval Ti of a wobbling period Tw of said light spot is selected to be the same as the wobbling period Tw of said light spot during a track pull-in operation.

27. A method as claimed in claim 26, wherein the wobbling of said light spot is effected in a manner that said light spot is wobbled from an initial position thereof to each side of a radial direction of said track by ½ of a track pitch.

28. A method as claimed in claim 26, wherein a wobbling period Tw for the wobbling of said light spot is selected to be 10 μs or less.

29. An optical disc memory apparatus comprising:
an optical disc;
an optical head for projecting a record/playback light spot at a desired track on said optical disc;
a macro moving mechanism for moving said optical head;
a micro moving mechanism mounted on one of said optical head and a base of said apparatus, and having a bandwidth of a control servo of at least 10 KHz during a track pull-in operation, said micro moving mechanism being adapted to move said light spot; and
track error detecting means for detecting a track error signal from a reflected light of said record/playback light spot, said track error detecting means including means for correcting an offset due to deviation of said reflected light from an optical central axis, wherein said means for correcting an offset includes means for producing a difference between reflected light quantities resulting from wobbling said record/playback light spot in a radial direction of said optical disc;
wherein an interval Ti of a wobbling period of said light spot is selected $Ti < 1/(3.2\pi fcf)$ with respect to a bandwidth fcf of a control servo of said micro moving mechanism.

30. An optical disc memory apparatus according to claim 29, wherein the bandwidth of the control servo of said micro moving mechanism is selected to be no greater than 5 KHz during said track following operation.

31. An optical disc memory apparatus according to claim 29, further comprising a linear scale having a resolution of substantially the same as a track pitch of said optical disc whereby a position of said optical head is detected by said linear scale.

32. An optical disc memory apparatus according to claim 31, wherein the resolution of said linear scale is the same as the track pitch of said optical disc.

33. An optical disc memory apparatus according to claim 31, wherein said linear scale comprises a diffraction grating mounted on a moving part of said optical head, and an optical system mounted on said base to project a converged laser beam onto said diffraction grating to detect a reflected light therefrom.

34. An optical disc memory apparatus according to claim 29, wherein in accordance with an output from said track error detecting means, said macro moving mechanism and said micro moving mechanism are driven during said track pull-in operation and said track following operation.

35. An optical disc memory apparatus according to claim 29, wherein said offset correcting means includes means for producing a sum of track error signals resulting from wobbling said record/playback light spot in a radial direction of said optical disc.

36. An optical disc memory apparatus according to claim 29, wherein said track error detecting means comprises means for detecting said track error signal from a difference between reflecting light quantities resulting from wobbling said record/playback light spot in a radial direction of said optical disc.

37. An optical disc memory apparatus according to claim 29, wherein a wobbling period Tw for the wobbling of said light spot is selected to be 10 μs or less.

38. An optical disc memory apparatus according to claim 29, wherein the bandwidth of the control servo of said micro moving mechanism is selected to be greater than 10 KHz during said track pull-in operation.

39. An optical disc memory apparatus comprising:
an optical disc;
an optical head for projecting a record/playback light spot at a desired track on said optical disc;
a macro moving mechanism for moving said optical head;
a micro moving mechanism mounted on one of said optical head and a base of said apparatus, and having a bandwidth of a control servo of at least 10 KHz during a track pull-in operation, said micro moving mechanism being adapted to move said light spot; and
track error detecting means for detecting a track error signal from a reflected light of said record/playback light spot, said track error detecting means including means for correcting an offset due to deviation of said reflected light from an optical central axis, wherein said means for correcting an offset includes means for producing a difference between reflected light quantities resulting from wobbling said record/playback light spot in a radial direction of said optical disc;
wherein an interval Ti of a wobbling period of said light spot is selected to be longer during track following operation than during track pull-in operation.

40. An optical disc memory apparatus comprising:
an optical disc;
an optical head for projecting a record/playback light spot at a desired track on said optical disc;
a macro moving mechanism for moving said optical head;
a micro moving mechanism mounted on one of said optical head and a base of said apparatus, and having a bandwidth of a control servo of at least 10 KHz during a track pull-in operation, said micro moving mechanism being adapted to move said light spot; and
track error detecting means for detecting a track error signal from a reflected light of said record/playback light spot, said track error detecting means including means for correcting an offset due to deviation of said reflected light from an optical central axis, wherein said means for correcting an offset includes means for producing a difference between reflected light quantities resulting from wobbling said record/playback light spot in a radial direction of said optical disc;
wherein an interval Ti of a wobbling period Tw of said light spot is selected to be the same with the wobbling period Tw for the wobbling of said light spot during track pull-in operation.

41. A light spot positioning method comprising the steps of performing a seek operation of positioning a record/playback light spot at a desired track on a recording medium by a macro moving mechanism for an optical head and a micro moving mechanism comprising a non-mechanical optical deflector mounted on one of said optical head a base of a record/playback apparatus, generating a track error signal based on reflected light from the recording medium of the light spot, and wobbling the light spot projected from said optical head from an initial position thereof to each side of the radial direction of said track by said micro moving mechanism, holding the track error signal at each side of said track, calculating sum of the track error signals at each side of said track, subtracting one half (½) of said sum from an initial track error signal to generate an offset-free track error signal, and simultaneously producing a difference between said track error signals resulting from said wobbling to generate an offset-free cross track signal having a 90-degree phase difference from said offset-free track error signal.

42. A light spot positioning method according to claim 41, wherein the wobbling of said light spot is effected in a manner that if w represents the amount of said wobbling to each side of the radial direction of said track from said initial position, said wobbling amount is selected with respect to a track pitch p, as follows $$0 < w < p/2.$$

43. A light spot positioning method comprising the steps of performing a seek operation of positioning a record/playback light spot at a desired track on a recording medium by a macro moving mechanism for an optical head and a micro moving mechanism comprising a non-mechanical optical deflector mounted on one of said optical head and a base of a record/playback apparatus, generating a track error signal based on reflected light from the recording medium of the light spot and wobbling the light spot projected from said optical head to each side of the radial direction of said track from an initial position thereof be said micro moving mechanism so that an offset-free track error signal is produced from a difference between resulting total reflected light quantities of the light spot projected onto said recording medium, holding the track error signal at each side of said track and simultaneously producing a sum of the total reflected light quantities of the track error signal at each side of said track and subtracting one half (½) of said sum from the total reflected light quantity of said initial position to generate an offset-free cross track signal having a 90-degree phase difference from said offset-free track error signal.

* * * * *